United States Patent [19]

White et al.

[11] Patent Number: 5,609,548
[45] Date of Patent: Mar. 11, 1997

[54] APPARATUS AND METHOD FOR COMMANDING A GEAR AFTER AN ABORTED SHIFT ATTEMPT IN CONTROLLING A MANUAL-AUTOMATIC TRANSMISSION

[75] Inventors: Gregory R. White, Columbus; Bryan S. Gatewood, Westport; Mark L. Wilson, Columbus, all of Ind.; Peter J. Griffen, Richmond, United Kingdom; Richard E. Kleine; Larry R. Webber, both of Columbus, Ind.

[73] Assignee: Cummins Engine Company, Inc., Columbus, Ind.

[21] Appl. No.: 488,260

[22] Filed: Jun. 7, 1995

[51] Int. Cl.⁶ ............................................. B60K 41/08
[52] U.S. Cl. ............................................ 477/124; 477/906
[58] Field of Search ................................... 477/124, 906

[56] References Cited

U.S. PATENT DOCUMENTS

| | | |
|---|---|---|
| 3,732,755 | 5/1973 | Beig et al. . |
| 4,598,374 | 7/1986 | Klatt . |
| 4,635,508 | 1/1987 | Tatsumi . |
| 4,648,291 | 3/1987 | Klatt et al. . |
| 4,685,548 | 8/1987 | Holtermann et al. . |
| 4,698,762 | 10/1987 | Moriya et al. . |
| 4,702,127 | 10/1987 | Cote . |
| 4,713,764 | 12/1987 | Klatt . |
| 4,722,248 | 2/1988 | Braun . |
| 4,823,646 | 4/1989 | Yoshimura et al. . |
| 4,890,515 | 1/1990 | Taniguchi et al. . |
| 4,892,014 | 1/1990 | Morell et al. . |
| 5,043,895 | 8/1991 | Hattori et al. . |
| 5,047,935 | 9/1991 | Kashihara . |
| 5,047,936 | 9/1991 | Ishii et al. . |
| 5,060,541 | 10/1991 | Shimanaka . |
| 5,063,511 | 11/1991 | Mack et al. . |
| 5,079,973 | 1/1992 | Ookubo et al. . |
| 5,089,965 | 2/1992 | Braun . |
| 5,090,269 | 2/1992 | Ohtsuka et al. . |
| 5,117,710 | 6/1992 | Asano et al. . |
| 5,117,711 | 6/1992 | Iizuka . |
| 5,150,297 | 9/1992 | Daubenmier et al. . |
| 5,157,607 | 10/1992 | Stainton et al. . |
| 5,167,311 | 12/1992 | Satoh et al. . |
| 5,182,969 | 2/1993 | Goto et al. . |
| 5,184,301 | 2/1993 | Stasell . |

FOREIGN PATENT DOCUMENTS

| | | |
|---|---|---|
| 0364220A2 | 11/1989 | European Pat. Off. . |
| 0384413A1 | 2/1990 | European Pat. Off. . |
| 0466036A1 | 7/1991 | European Pat. Off. . |
| 2278654 | 5/1994 | United Kingdom . |
| WO94/21484 | 9/1994 | WIPO . |

*Primary Examiner*—Dirk Wright
*Attorney, Agent, or Firm*—Woodard, Emhardt, Naughton, Moriarty & McNett

[57] ABSTRACT

An electronic engine control controls the selection and confirmation of automatically selectable gears in a manual/automatic transmission. Failure to disengage the engine from the transmission within a predetermined time period, failure to reach a predetermined synchronous engine RPM window within another predetermined time period and failure to confirm gear engagement within yet another predetermined time period are three automatic shift failure modes which may cause an automatic shift attempt to fail or be aborted. A fourth automatic shift failure may occur if the clutch pedal is depressed during an automatic shift attempt. If any of the foregoing automatic shift failure mechanisms is detected, an error recovery algorithm which forms a part of the present invention determines the easiest/safest transmission gear to command to prevent the driver from having to manually attempt to engage the transmission after a failed automatic shift attempt.

20 Claims, 10 Drawing Sheets

FIG. 7  UPSHIFT

FIG. 8 DOWNSHIFT

APPARATUS AND METHOD FOR COMMANDING A GEAR AFTER AN ABORTED SHIFT ATTEMPT IN CONTROLLING A MANUAL-AUTOMATIC TRANSMISSION

FIELD OF THE INVENTION

The present invention relates to electronically controlled transmissions used in conjunction with internal combustion engine powered vehicles, and more specifically to a transmission/engine combination wherein the transmission is a combination manual and automatic transmission.

BACKGROUND OF THE INVENTION

Fully automatic transmission systems, both for heavy duty vehicles such as heavy duty trucks, and for automobiles, that sense throttle openings or position, vehicle speed, engine speed and the like, and automatically shift the vehicle transmission in accordance therewith, are well known in the prior art. Such fully automatic gear change transmission systems include automated transmissions wherein pressurized fluid is utilized to frictionally engage one or more members to other members or to a ground to achieve a selected gear ratio as well as automated mechanical transmissions utilizing electronic and/or pneumatic logic and actuators to engage and disengage mechanical (i.e., positive) clutches to achieve a desired gear ratio. Semi-automatic or manual-automatic transmission systems utilizing electronic control units that sense throttle position, engine speed, input shaft speed, output shaft and/or vehicle speed, and utilize automatically controlled fuel throttle devices, gear shifting devices, and/or master clutch operating devices to substantially automatically implement operator selected transmission ratio changes are also known in the prior art.

While such semi-automatic mechanical transmission systems are very well received, as they are somewhat less expensive than a fully automatic transmission systems, allow manual clutch control for low speed operation, and/or do not require automatic selection of the operating gear ratio, they may be too expensive for certain applications as a relatively large number of sensors and automatically controllable actuators, such as a master clutch and/or a fuel throttle device actuator, are required to be provided, installed, and maintained. However, with modern electronic controls for heavy duty truck engines, the majority, if not all, of the sensors are already present for providing feedback relating to engine speed, vehicle speed, throttle position, etc. Thus, an implementation of a semi-automatic transmission or manual-automatic transmission can be achieved with minor modifications to the hardware, particularly those vehicles including an electronic engine controller. Such systems require relatively sophisticated algorithms to provide reliable operation particularly with respect to the upshift and downshift of the automatically controlled gear ratios of the manual-automatic transmission.

During an automatic shift attempt, the shift may be aborted, or otherwise not completed, due to a number of reasons such as a failed solenoid, failed sensors, failure to complete certain events within a specified time period, and the like, or by operator interaction such as by depressing the clutch. In such a case, it is desirable to engage, or attempt to engage, a gear so that the transmission is not left in a neutral state for an extended period of time. The control algorithm that forms a part of the present invention provides a highly reliable mechanism for commanding the safest and/or most likely to engage transmission gear after an aborted shift attempt.

SUMMARY OF THE INVENTION

In accordance with one aspect of the present invention, a method for commanding a transmission gear after an aborted automatic shift attempt in a vehicle having an engine with a throttle capable of being enabled for operator control and of being inhibited from operator control, and a manual/automatic transmission having a plurality of manual and automatically selectable gears, wherein the aborted automatic shift attempt includes inhibiting throttle control by the operator, disengaging the transmission from the engine, controlling the engine speed to a synchronous RPM value at which an ensuing automatic shift should take place, and commanding one of the plurality of automatically selectable gears, comprises the steps of: (1) performing steps (2)–(4) if the shift was aborted because the transmission did not disengage from the engine within a first predetermined time period; (2) commanding the lowest of the automatically selectable gears if the aborted automatic shift attempt was an upshift; (3) commanding the highest of the automatically selectable gears if the aborted automatic shift attempt was a downshift; and (4) enabling throttle control by the operator.

In accordance with another aspect of the present invention, a method for commanding a transmission gear after an aborted automatic shift attempt in a vehicle having an engine with a throttle capable of being enabled for operator control and of being inhibited from operator control, and a manual/automatic transmission including a plurality of manual and automatically selectable gears, wherein the aborted automatic shift attempt includes inhibiting throttle control by the operator, disengaging the transmission from the engine, controlling the engine speed to a first synchronous RPM value at which an ensuing automatic shift should take place, and commanding one of the plurality of automatically selectable gears, comprises the steps of: (1) performing steps (2)–(10) if the shift was aborted because the engine speed did not achieve the first synchronous RPM value within a first predetermined time period; (2) performing steps (9)–(10) if the aborted automatic shift attempt was a downshift; (3) sensing vehicle speed; (4) performing steps (9)–(10) if the product of the vehicle speed and a gear ratio of the lowest of the automatically selectable gears is greater than a predetermined speed; (5) calculating a second synchronous RPM value corresponding to an engine speed at which an automatic shift to the lowest of the automatically selectable gears should take place; (6) fueling the engine to achieve an engine speed within a predetermined RPM range of the second synchronous RPM value; (7) sensing engine speed; (8) performing steps (9)–(10) if the engine speed is not within the predetermined RPM range of the second synchronous RPM value within a second predetermined time period; (9) commanding the highest of the automatically selectable transmission gears; and (10) enabling throttle control by the driver.

In accordance with yet another aspect of the present invention, a method for commanding a transmission gear after an aborted automatic shift attempt in a vehicle having a clutch, an engine with a throttle capable of being enabled for operator control and of being inhibited from operator control, and a manual/automatic transmission including a plurality of manual and automatically selectable gears, wherein the aborted automatic shift attempt includes inhibiting throttle control by the operator, disengaging the transmission from the engine, controlling the engine speed to a first synchronous RPM value at which an ensuing automatic shift should take place, and commanding one of the plurality of automatically selectable gears, comprises the steps of: (1) performing steps (2)–(5) if the automatic shift was aborted because the clutch was depressed while the shift was in progress; (2) determining the engagement status of the highest of the automatically selectable transmission gears when the clutch was depressed; (3) performing steps (4)–(5) if the highest of the automatically selectable transmission gears was determined to be engaged in step (2); (4) commanding the highest of the automatically selectable gears if disengagement of the transmission from the engine was commanded when the clutch was depressed; and (5) enabling throttle control by the operator.

In accordance with a further aspect of the present invention, a control device for use with a motor vehicle having an engine with a throttle capable of operator control and of being inhibited from operator control, and a manual/automatic transmission including a gear selection input and further having a manual gear selection mode of operation and an automatic gear shift mode of operation including a plurality of automatically selectable gears, comprises: means for detecting gear disengagement when the engine is disengaged from the transmission; and processor means for controlling the automatic shift mode of operation. The processor means commences the automatic shift mode of operation by inhibiting the throttle from operator control and commanding disengagement of the engine from the transmission. The processor means thereafter responds to the means for detecting gear disengagement by aborting the automatic shift attempt if the means for detecting gear disengagement fails to detect gear disengagement within a first predetermined time period after commanding gear disengagement, and the processor means thereafter commands the highest of the automatically selectable transmission gears if the automatic shift attempt was a downshift attempt. The processor means otherwise commands the lowest of the automatically selectable transmission gears. Finally, the processor means returns throttle control to the operator.

In accordance with still a further aspect of the present invention, a control device for use with a motor vehicle having an engine with a throttle capable of operator control and of being inhibited from operator control, and a manual/automatic transmission including a gear selection input and further having a manual gear selection mode of operation and an automatic gear shift mode of operation and including a plurality of automatically selectable gears, comprises: means for detecting gear disengagement when the engine is disengaged from the transmission and providing a gear disengagement signal corresponding thereto; means for sensing engine speed and providing an engine speed signal corresponding thereto; and processor means for controlling the automatic shift mode of operation. The processor means has a first input for receiving the gear disengagement signal and a second input for receiving the engine speed signal, and the processor means commences the automatic shift mode of operation by inhibiting the throttle from operator control and commanding disengagement of the engine from the transmission. The processor means thereafter responds to the gear disengagement signal to govern the engine speed to a first predetermined RPM level after gear disengagement is detected, and the processor means responds to the engine speed signal to abort the automatic shift attempt if the means for sensing engine speed fails to detect an engine speed within a predetermined range of the first predetermined RPM level within a first predetermined time period after governing the engine speed. The processor means thereafter commands the highest of the automatically selectable transmission gears and enables throttle control by the operator if the automatic shift attempt was a downshift attempt.

In accordance with yet a further aspect of the present invention, a control device for use with a motor vehicle having an engine with a throttle capable of operator control and of being inhibited from operator control, and a manual/automatic transmission including a gear selection input and further having a manual gear selection mode of operation and an automatic gear shift mode of operation and including a plurality of automatically selectable gears, comprises: means for detecting gear disengagement when the engine is disengaged from the transmission and providing a gear disengagement signal corresponding thereto; means for detecting gear engagement when the engine is engaged to the transmission and providing a gear engagement signal corresponding thereto; means for sensing engine speed and providing an engine speed signal corresponding thereto; and processor means for controlling the automatic shift mode of operation. The processor means has a first input for receiving said gear disengagement signal, a second input for receiving the gear engagement signal and a third input for receiving the engine speed signal. The processor means commences the automatic shift mode of operation by inhibiting the throttle from operator control and commanding disengagement of the engine from the transmission. The processor means thereafter responds to the gear disengagement signal to govern the engine speed to a first predetermined RPM level after gear disengagement is detected and responds to the engine speed signal to command an appropriate one of the plurality of automatically selectable transmission gears when the engine speed signal is within a first RPM range of the first predetermined RPM level. The processor means responds to the gear engagement signal to abort the automatic shift attempt if the means for detecting gear engagement fails to detect gear engagement of the engine to the appropriate one of the plurality of automatically selectable transmission gears within a first predetermined time period after commanding the appropriate gear, and thereafter commands the highest of the automatically selectable transmission gears and enables throttle control by the operator if the automatic shift attempt was a downshift attempt.

In accordance with still a further aspect of the present invention, a control device for use with a motor vehicle having an engine with a throttle capable of operator control and of being inhibited from operator control, a clutch, and a manual/automatic transmission including a gear selection input and a top gear indicator switch, and further having a manual gear selection mode of operation and an automatic gear shift mode of operation, and including a plurality of automatically selectable gears and a neutral position, comprises: means for sensing selection of the highest of the automatically selectable gears and providing a top gear signal corresponding thereto; means for sensing activation of the clutch and producing a clutch signal corresponding thereto; and processor means for controlling the automatic shift mode of operation. The processor means has a first input for receiving the vehicle speed signal, a second input for receiving the clutch signal and a third input connected to the top gear switch. The processor means commences the automatic shift mode of operation by inhibiting the throttle from operator control. The processor means thereafter responds to the clutch signal and the top gear signal to command the highest of the automatically selectable gears and return throttle control to the operator if the automatic shift attempt was a shift into the neutral position, and the processor means returns throttle control to the operator if the automatic shift was a shift to one of the automatically selectable gears.

It is one object of the present invention to provide an error recovery system and method for commanding the safest and/or most likely to engage automatically selectable transmission gear if disengagement from the current transmission gear, pursuant to an automatic shift request, fails to occur within a predetermined time period.

It is another object of the present invention to provide an error recovery system and method for commanding the safest and/or most likely to engage automatically selectable transmission gear if a synchronous engine RPM after disengagement from the current transmission gear, pursuant to an automatic shift request, fails to be achieved within a predetermined time period.

It is yet another object of the present invention to provide an error recovery system and method for commanding the safest and/or most likely to engage automatically selectable transmission gear if confirmation of engagement to a desired transmission gear, pursuant to an automatic shift request, fails to occur within a predetermined time period.

It is still another object of the present invention to provide an error recovery system and method for commanding the safest and/or most likely to engage automatically selectable transmission gear if the clutch is depressed during an automatic shift operation pursuant to an automatic shift request.

These and other objects of the present invention will become more apparent from the following description of the preferred embodiment.

DESCRIPTION OF THE PREFERRED EMBODIMENT

Figure 1:
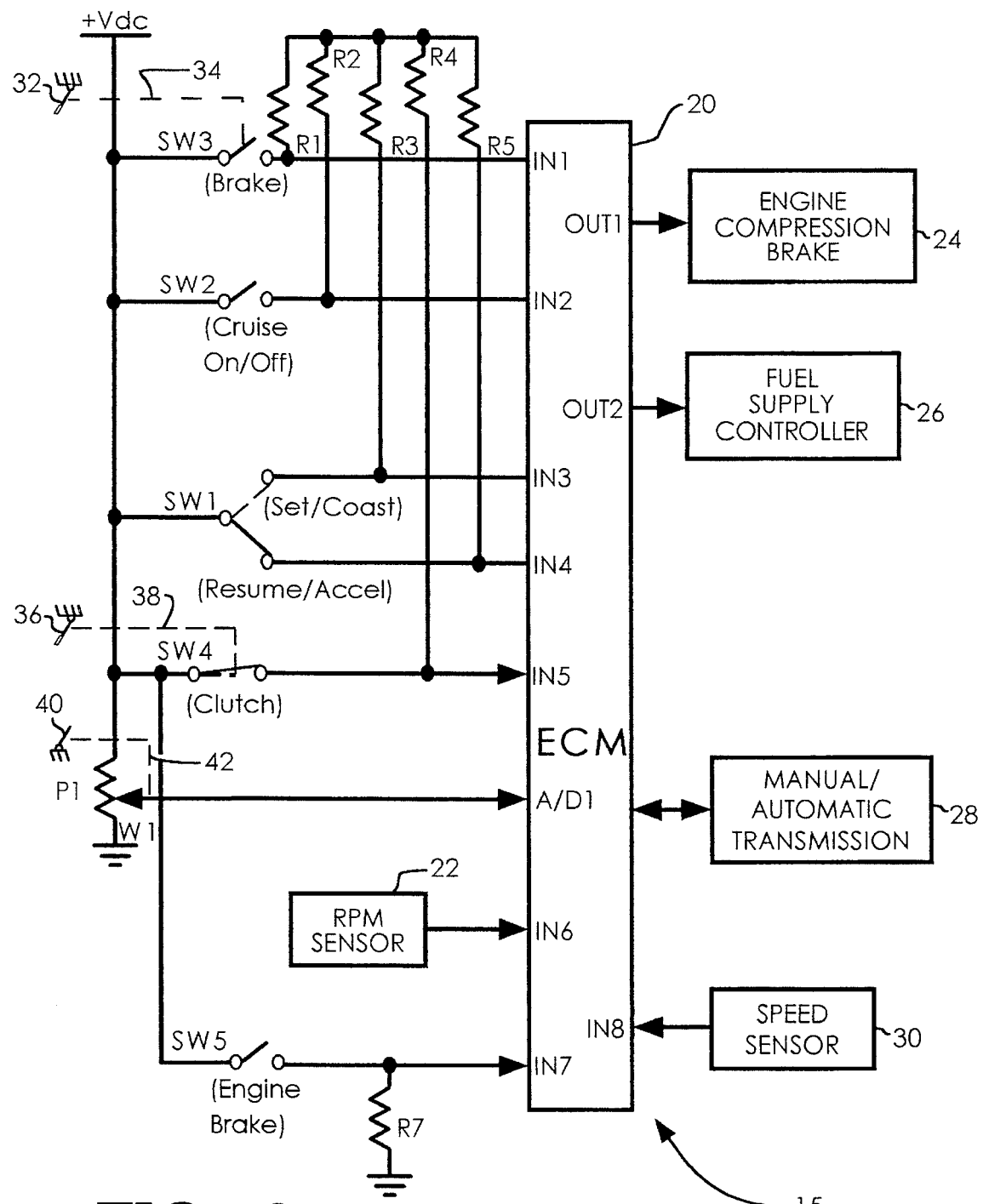
FIG. 1 is a diagrammatic illustration of an electronic controller consistent with the teachings of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

SYSTEM HARDWARE

Referring to FIG. 1, a diagrammatic illustration of a control system 15 according to the present invention is shown. The control system 15 includes as its central component electronic control module (ECM) 20. ECM 20 is a microcomputer including a microprocessor having memory including ROM and RAM and a plurality of inputs and outputs (I/O) in addition to interface circuits for I/O interfacing. ECM 20 may further include EPROM, EEPROM, Flash PROM and any other reusable type of read-only-memory known to those skilled in the art. The input signals supplied to ECM 20 are produced by various switches and sensors which respond to operating conditions of the engine and vehicle, and inputs from the driver.

Switches SW1 and SW2 are mounted in the driver's cab or driver compartment and provide the driver with a means for turning the cruise control functions on and off, via switch SW2, and for establishing a desired cruise speed via switch SW1, as well as permitting the vehicle to operate without cruise control operation. Switch SW1 also provides input signals to activate resume/acceleration features well known in the art of cruise control systems. Switch SW2 enables cruise control operation while switch SW1 is used to activate the operational modes of the cruise control system built into the software of ECM 20. Switch SW1 is a momentary center-off SPDT switch. The set/coast cruise control function is activated by shorting input IN3 of ECM 20 to logic high voltage, or $+V_{DC}$. This is accomplished by closing switch SW1 and connecting $+V_{DC}$ to the signal path connected to resistor R3 and input IN3. In the alternative, when switch SW1 is actuated to connect input IN4 and resistor R5 with $+V_{DC}$, input IN4 is raised to a logic high and the ECM 20 is informed that the driver is actuating the resume or acceleration features of the cruise control system.

Switch SW4 provides an input signal to IN5 of ECM 20 indicative of the operational state of the vehicle clutch. The vehicle clutch is activated by clutch pedal 36. A mechanical linkage 38 interconnects switch SW4 with pedal 36 so that switch SW4 is opened when the driver or operator depresses clutch pedal 36 thereby mechanically disengaging the engine of the vehicle from the transmission of the vehicle.

Switch SW4 is normally closed, thus when the clutch pedal 36 is released, a $+V_{DC}$ signal is supplied to input IN5 of ECM 20. When switch SW4 is opened, as a result of clutch pedal 36 being depressed, switch SW4 opens and resistor R4 pulls the input IN5 to logic low or ground.

Switch SW5 is a driver-operated switch which provides an input signal to the ECM 20 regarding the operating state (on/off) of the engine compression brake desired by the driver. Switch SW5 is a normally open switch which, when closed, supplies a high logic signal level to input IN7 of ECM 20 indicating engine brake operation is desired. When switch SW5 is open, resistor R7 pulls input IN7 to logic low or ground, thereby providing ECM 20 with a logic low signal corresponding to a driver request to disable or discontinue engine brake operation.

Accelerator pedal 40 is mechanically coupled, via linkage 42 to the wiper W1 of potentiometer P1. The wiper W1 is connected to an analog to digital (A/D) converter input A/D1 of ECM 20. The position of accelerator pedal 40 corresponds directly to the voltage present on wiper W1. Although potentiometer P1 is connected at one terminal to $+V_{DC}$ and at the other terminal to ground, the voltage present on wiper W1 ranges between a window of (ground+ deltav1) and ($+V_{DC}$–deltav2), where deltav1 and deltav2 represent voltage offsets. In this application, when accelerator pedal 40 is in the throttle closed or non-depressed position, the voltage present on wiper W1 is below a predetermined voltage corresponding to a throttle closed position. If the wiper W1 voltage is above a predetermined voltage, it is considered by the ECM 20 to be an indicator that the throttle is open. Throttle control by the operator, including cruise control operation, may be inhibited by the ECM 20 and thereafter controlled by the ECM 20.

Output OUT1 of ECM 20 supplies a signal to engine compression brake 24 which is a part of the engine of the vehicle (not shown), to provide engine compression braking operation as is well known in the operation of heavy duty trucks.

Output OUT2 of ECM 20 provides continuously variable signals which control the fuel supply controller 26. The continuously variable signals supplied to fuel supply controller 26 enable ECM 20 to fuel the engine of the vehicle to any particular rpm (revolutions per minute) desired. Under normal vehicle operation, the throttle is controlled by the driver via the accelerator pedal 40. In this normal mode of operation, the fuel supply controller 26 is actuated in response to driver demand. However, throttle control by the driver is capable of being inhibited by the ECM 20 so that the ECM 20 may control the fuel supply controller 26 to fuel the engine in certain situations to be more fully discussed hereinafter. Fuel supply controller may take the form of a fuel shut-off valve, fuel injectors or other fueling mechanisms responsive to electronic signals for controlling fuel supply rates to an engine.

Speed sensor 30 and RPM sensor 22 supply signals to ECM 20 indicative of the vehicle speed and engine speed, respectively. RPM sensor 22 supplies a pulse train signal to input IN6 of ECM 20. The pulse train signal supplied to input IN6 is monitored by ECM 20 to determine engine RPM speed. Similarly, the speed sensor 30, which detects tail shaft or drive shaft rotational speed, provides a similar pulse train signal to input IN8 of ECM 20 wherein the frequency of the pulse train delivered to ECM 20 indicates the speed of rotation of the output shaft of the transmission 28 or the drive shaft of the vehicle drive train.

The manual automatic transmission 28 is connected via various signal path lines to ECM 20. The interface between ECM 20 and manual/automatic transmission (MAT) 28 is more specifically shown for two different transmission embodiments in FIGS. 2 and 3, respectively. The I/O interface between ECM 20 and MAT 52 shown in FIG. 2 includes a gear engagement status logic feedback signal supplied to input IN10 as well as an automatic shift-mode request switch SW6 that supplies a logic signal to input IN11 indicating whether automatic gear shifting operation is desired. Switch SW6 is actuated in response to driver positioning of gearshift lever 50. Gear shift lever 50 is coupled to switch SW6 via actuator linkage 54. Resistor R6 maintains the logic signal present at input IN11 of ECM 20 at a logic high whenever normally open switch SW6 is not closed. When switch SW6 is closed, the logic signal present at input IN11 is at a logic low level. Gear selection logic signals supplied to outputs OUT3 and OUT4 of ECM 20 control the actuation of sixth gear and seventh gear solenoid actuators (not shown) of the MAT 52 to thereby select six and seventh gears respectively. MAT 52 is a Spicer transmission Model No. AS125-7 manufactured by Spicer, a subsidiary of Dana Corporation.

The signal supplied from MAT 52 to input IN10 of ECM 20 is a logic signal indicating that MAT 52 is in a neutral (no gears engaged) operational state when the signal is at a logic low level. When the signal supplied to input IN10 of ECM 20 from MAT 52 is a logic high signal, an "in-gear" condition of operation of MAT 52 is confirmed. The signal supplied to input IN10 does not indicate which automatically selectable gear ratio operation state is currently engaged. Nevertheless, ECM 20 is aware of the logic output levels at outputs OUT3 and OUT4. Thus, ECM 20 can determine whether MAT 52 was attempted to be placed into sixth gear automatic operation state or seventh gear automatic operation state by the status of outputs OUT3 and OUT4. Whether MAT 52 actually engaged six or seventh gear, however, must be determined via a gear confirmation, or gear verification, process. One embodiment of such a gear confirmation process typically used with MAT 52 is shown and described hereinafter with respect to FIGS. 7 and 8. Automatic gear shifting thus occurs in the "top two" gears according to shift algorithms contained within the ECM 20.

Figure 4:
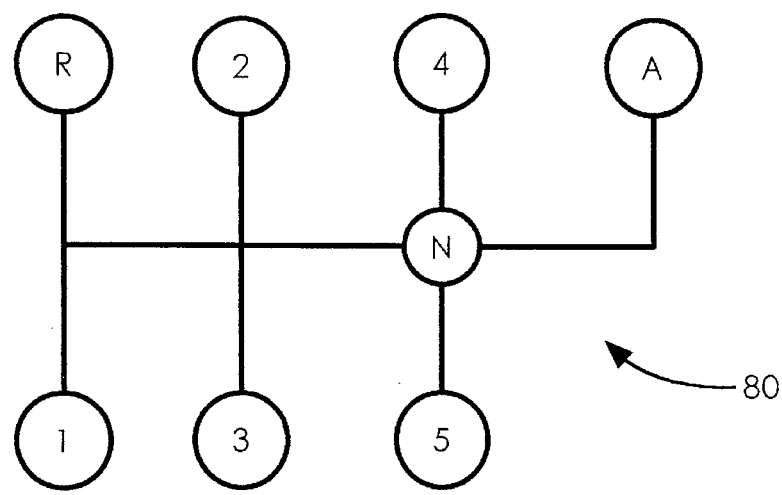
FIG. 4 is a diagrammatic illustration of the shift pattern for a Dana Spicer 7-speed heavy duty truck transmission.

Switch SW6 is actuated only when shift lever 50 is placed into the automatic operation mode position depicted by the shift position A in FIG. 4 wherein automatic actuation of sixth and seventh gear is requested by the driver of the vehicle. The other shift lever positions of FIG. 4 correspond to the reverse, first, second, third, fourth, and fifth gear ratio operation states which are manually selectable or engageable by the driver.

Figure 3:
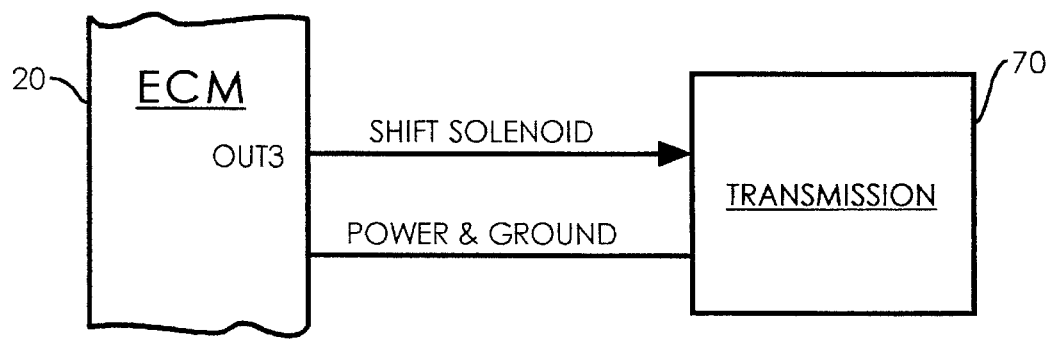
FIG. 3 is another embodiment of the control interface between engine control module and transmission of FIG. 1.
Figure 5:
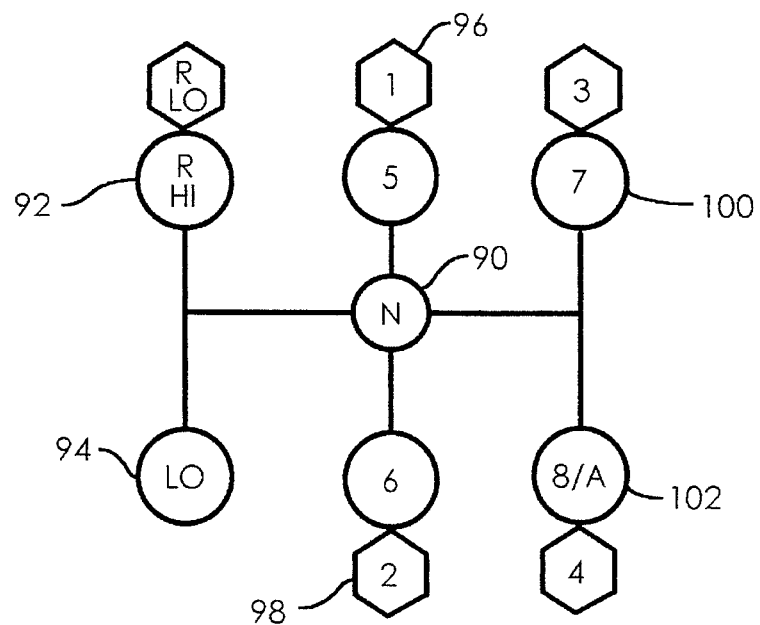
FIG. 5 is a diagrammatic illustration of an Eaton Fuller heavy duty truck transmission shift pattern.

In an alternative transmission embodiment shown in FIG. 3, ECM 20 is electronically connected to and interfaced with MAT 70, an Eaton/Fuller, Inc. transmission model RTT 12609A. The only I/O interface signal required between MAT 70 and ECM 20 is an output signal from output OUT3 supplied to the splitter gear box electro-pneumatic solenoid actuator (not shown) of MAT 70. The splitter gear box of MAT 70 provides an overdrive gear ratio when the MAT 70 is in the highest speed gear operation state. This is further illustrated in FIG. 5 by the gearshift pattern shown which corresponds to the Eaton/Fuller MAT 70. Neutral is found at position 90. Reverse gears are selectable at position 92 and forward gear ratio operational states that are manually selectable are shown at positions 94, 96, 98, 100, and 102. Once the driver has shifted manually through the gears according to the shift order of low, one, two, three, four, five, six, seven, and finally shifted the MAT 70 into the manual gearshift position labeled 8/A, the automatic shifting function of the ECM software is activated to supply a gear request signal at output OUT3 of ECM 20 to shift back and forth between high split and low split to thereby provide an overdrive final drive ratio or higher speed capability gear ratio for MAT 70. Thus, at location 102 the position labeled 8/A is the last manually selected gear position during the manual gear shifting phase of vehicle operation prior to the engagement or selection of automatic shift-mode operation.

The Eaton/Fuller embodiment of the present invention does not require switch SW6 since the auto-shift mode is detected, through software, by comparing engine speed and tailshaft speed. If the ratio of engine speed to tailshaft speed is within a predetermined ratio range, ECM 20 recognizes that the driver has shifted MAT 70 into position 102 in FIG. 5. Thereafter, until the ratio of engine speed to tailshaft speed falls outside the predetermined ratio range, ECM 20 controls the "top two" gears of MAT 70 according to shift algorithms forming a part of the ECM 20 software.

Even though the splitter does not have a true neutral state, there is a point where the splitter is neither in low or high split (ie. disengaged). Disengagement is detected if the engine speed, detected at input IN6 of the ECM 20, is outside of a disengagement window defined as a predetermined deltaI RPM level above or below the tailshaft speed, detected at input IN8 of the ECM 20. Typically, deltaI is approximately 150 RPM, but the present invention contemplates deltaI RPM levels between approximately 5 RPM and 500 RPM. "Neutral" in the MAT 70 application is thus detected by software.

Although the interface between MAT 52 and ECM 20 versus the interface between MAT 70 and ECM 20 are substantially different, the operational features are significantly similar when either MAT 52 or 70 is placed into the automatic shift-mode operation state wherein the "top two" final drive gear ratio operation states are automatically selected by the ECM 20. Two electro-pneumatic solenoid valves (not shown) are actuated by logic signals supplied to output OUT3 and output OUT4 of ECM 20 in FIG. 2 to engage sixth gear, seventh gear or neutral operation mode of MAT 52. Pressurized air and air cylinder(s) (not shown) within the MAT 52 or 70 supply the automatic shift mode gear engaging action according to the position of the solenoid valve(s).

One electro-pneumatic solenoid valve is required to operate the splitter of MAT 70 shown in FIG. 3. Thus, the signal supplied to output OUT3 actuates an electro-pneumatic solenoid valve (not shown) which actuates the splitter of MAT 70. The embodiments shown in FIG. 2 and FIG. 3 both include power and ground signals supplied via signal path 58 between the ECM 20 and the MATs 52 and 70.

AUTOMATIC GEAR SHIFTING

Figure 2:
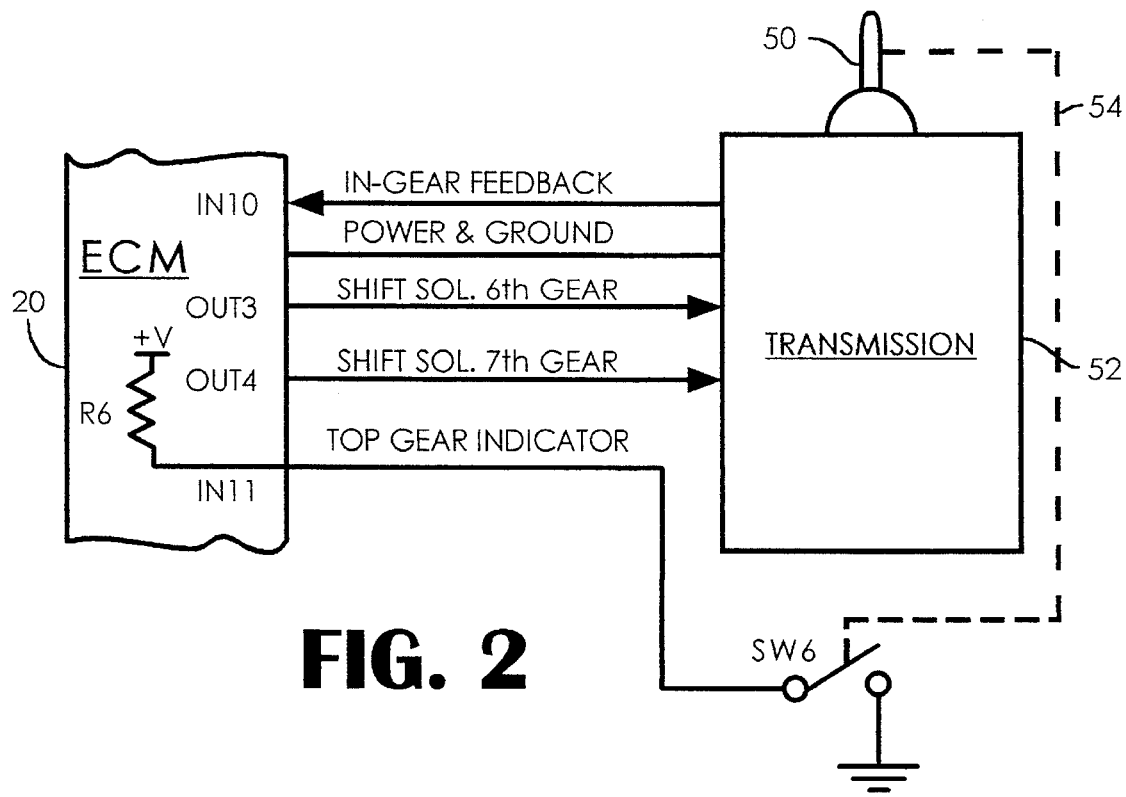
FIG. 2 is a diagrammatic illustration of one embodiment of the engine control module to manual/automatic transmission control interface.
Figure 6:
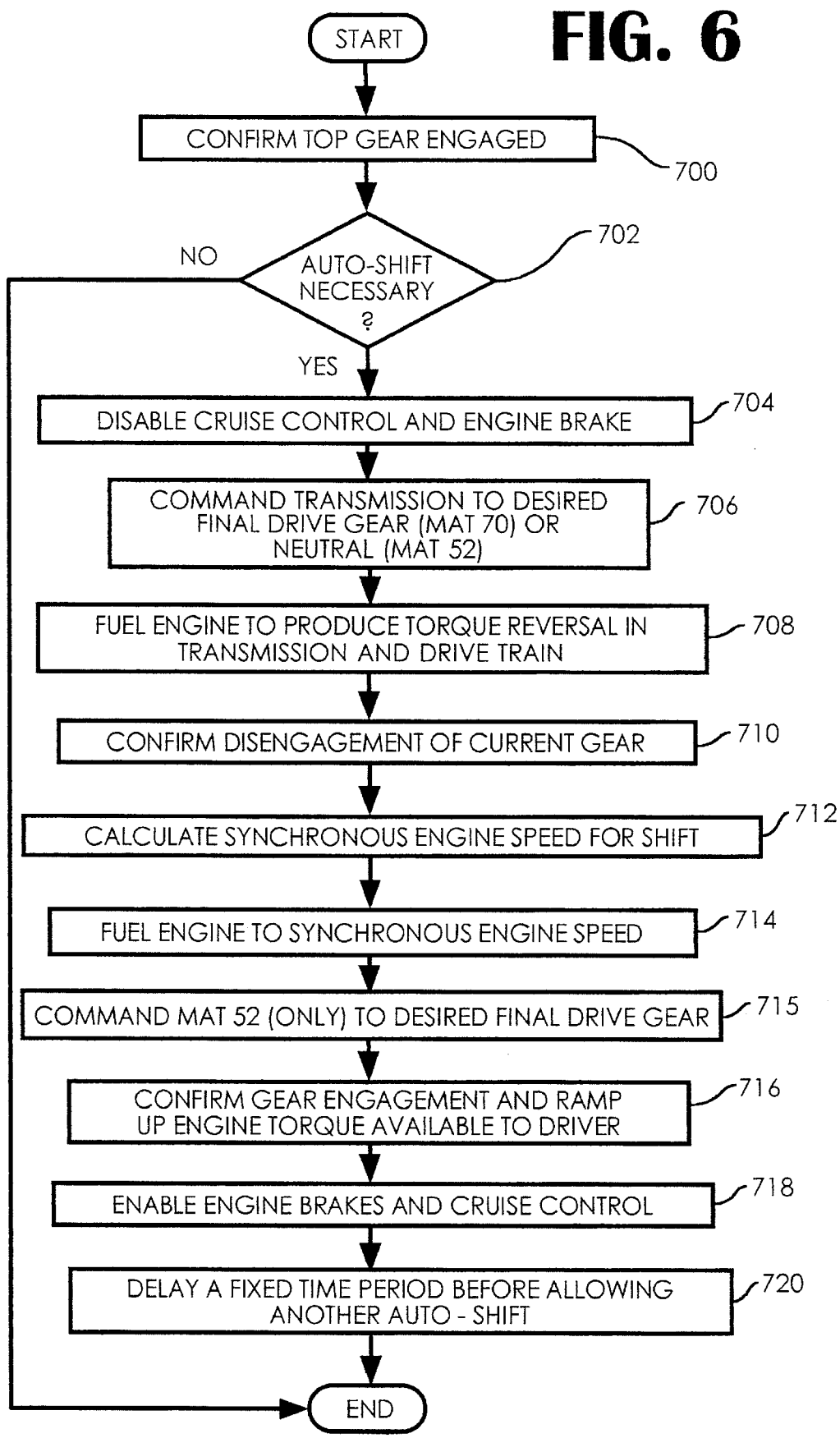
FIG. 6 is a flowchart of an auto-shift sequence according to the present invention.

Operationally speaking, an auto-shift to be performed in the top two gears of the system shown in FIG. 1 and FIG. 2 or FIG. 3 includes the following sequence of events (and is reflected in the flowchart of FIG. 6): (1) confirm that one of the top two gears is engaged, (step 700), (2) determine if an auto-shift is necessary, (step 702), (3) disable cruise control and engine brakes if active, (step 704), (4) command the transmission shift solenoid (or solenoids) to the requested gear (MAT 70), or neutral (MAT 52), (step 706), (5) fuel the engine to produce a torque reversal in the transmission and drive train, (step 708), (6) confirm disengagement of the current gear, (step 710), (7) calculate synchronous engine speed to engage desired auto-shift gear ratio operation state, (step 712), (8) fuel engine to achieve synchronous engine speed, (step 714), (9) command the transmission solenoid to the final drive gear (MAT 52 only), (step 715), (10) confirm gear engagement, (step 716), (11) ramp the engine torque available to the driver, (step 716), (12) return engine brakes and cruise control to their operational state prior to the auto-shift sequence initiation, (step 718), and (13) delay a fixed period of time before attempting another auto-shift (step 720).

A number of operational factors or conditions are monitored to determine whether to initiate or inhibit an auto-shift sequence. The ECM 20 continuously monitors the system inputs numerous times a second to determine whether or not an auto-shift sequence can be initiated. A preferred repetition time span is approximately 96 milliseconds, although other repetition time intervals are contemplated; that is the ECM 20 should determine whether an auto-shift condition is present and whether an auto-shift should be initiated every 96 milliseconds. An auto-shift is inhibited if any of the following conditions exist: (1) one of the top gears is not confirmed as engaged, which is a condition precedent for an automatic mode upshift or an automatic mode downshift, (2) vehicle speed is below a predetermined level, (3) the clutch pedal is depressed before or during the auto-shift process, (4) a shift delay has not elapsed since the previous auto-shift, and (5) other system faults which indicate to the ECM 20 that an automatic mode shift or auto-shift should not occur, such as speed sensor or RPM sensor failure, or other such hardware failures which prevent proper and safe operation of the auto-shift mode of operation. A manual-automatic transmission and engine control system as depicted in U.S. Pat. No. 5,401,223 to Gregory R. White, et al., provides a more detailed description of the typical components in a manual-automatic transmission and electronic engine control system, as well as the considerations for determining when and whether to initiate or inhibit an auto-shift sequence, the contents of which are incorporated herein by reference.

Figure 7:
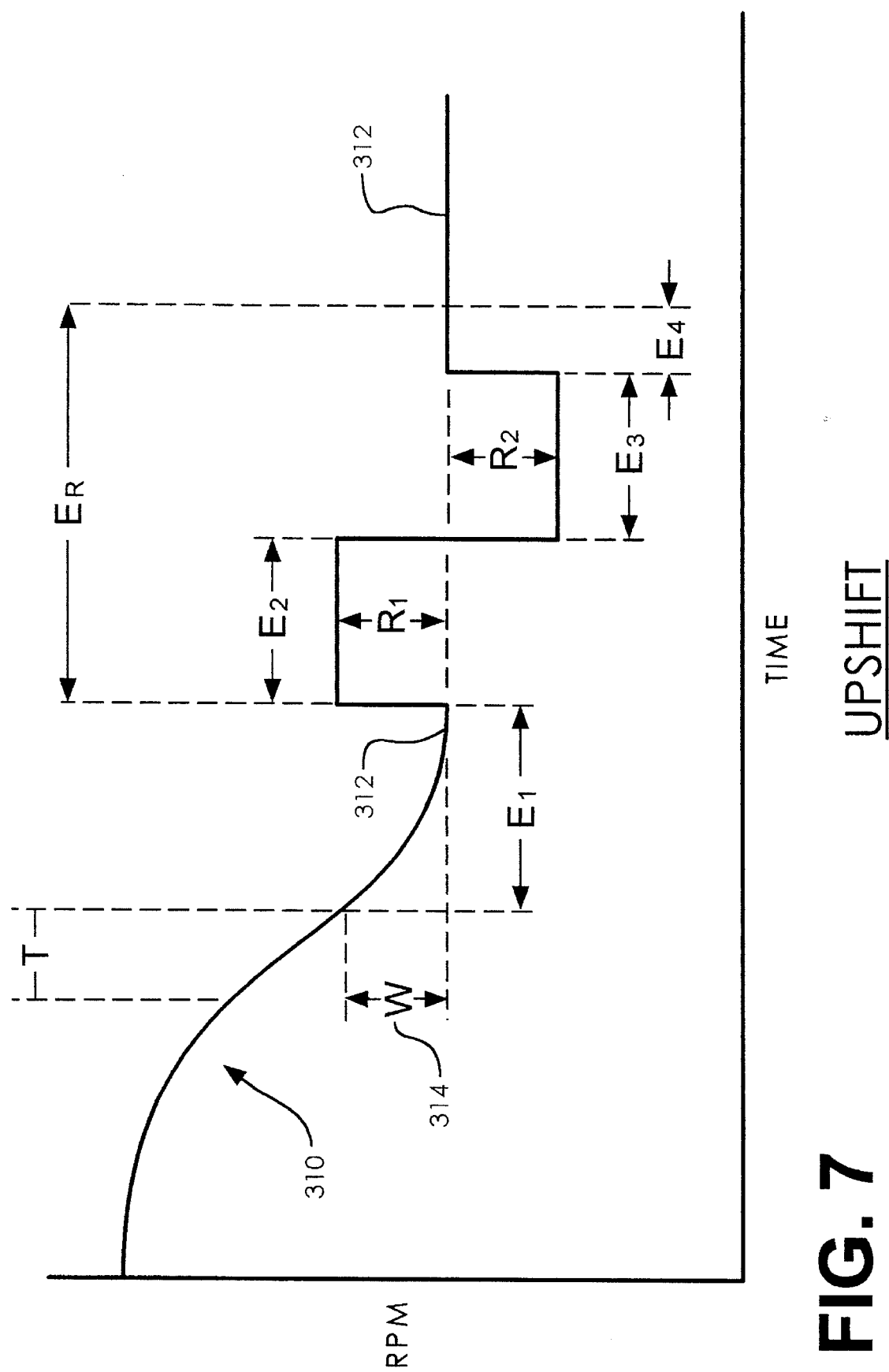
FIG. 7 is a graph of engine RPM versus time for a gear engagement process typically used during an upshift sequence in controlling the transmission embodiment of FIG. 2.
Figure 8:
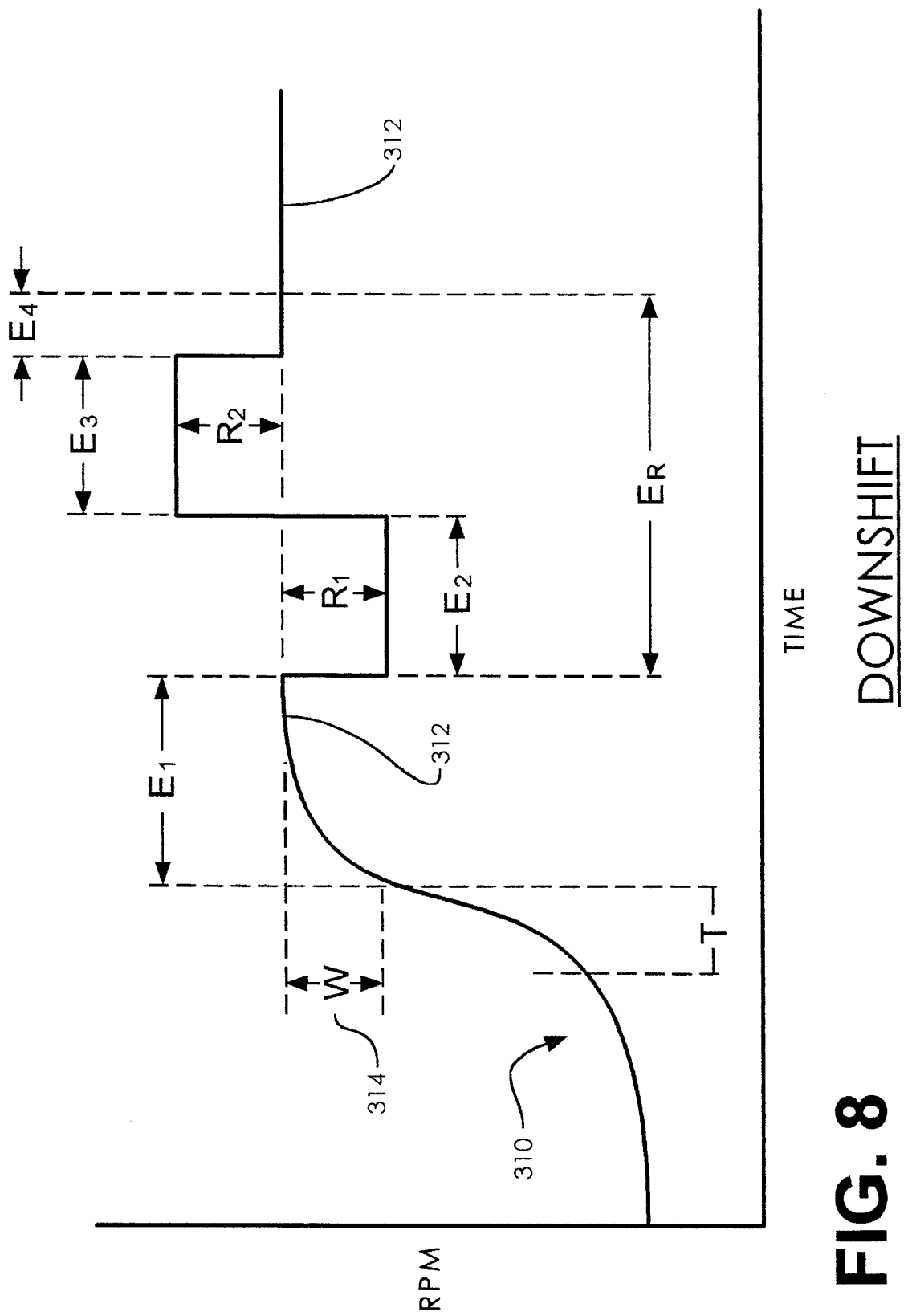
FIG. 8 is a graph of engine RPM versus time for a gear engagement process typically used during a downshift sequence in controlling the transmission embodiment of FIG. 2.

Referring now to FIGS. 7 and 8, a description of a typical process for assisting and confirming gear engagement in, for example, MAT 52, will now be provided. Curve 310 describes the engine RPM versus time during upshift (FIG. 7) and downshift (FIG. 8) operations. Once the cruise control or the engine compression brake are inhibited by ECM 20 and the throttle is inhibited from driver control, the gear currently engaged is disengaged pursuant to either an automatic upshift or automatic downshift commanded by ECM 20. When the ECM 20 detects gear disengagement, as previously discussed, the ECM 20 governs the engine speed to a calculated synchronous RPM represented by the RPM level 312 on RPM curve 310. If gear disengagement is not detected within a gear disengagement time D after commanding the transmission to disengage a desired one of the automatically selectable gears, then the automatic shift process is aborted and error recovery is performed as fully discussed hereinafter. Typically, D is set at approximately 650 milliseconds, although D may range from between approximately 100 milliseconds to 2.0 seconds.

To achieve synchronous RPM 312, ECM 20 computes the fueling requirements to synchronize the engine speed, sensed at IN 6 with the transmission tailshaft speed or driveshaft rotational speed, sensed at IN 8, to allow engagement of the desired gear, and commands the fuel supply control 26 to supply the fuel required to achieve synchronous RPM 312.

Once the engine RPM is within the synchronous window 314 defined as the synchronous RPM 312 plus a deviation W for an upshift as shown in FIG. 7, or the synchronous RPM 312 minus the deviation W for a downshift as shown in FIG. 8, one of the automatically selectable gears is requested by the ECM 20. An upshift signal commands a higher automatically selectable gear, such as when shifting from 6th gear automatic to 7th gear automatic, and a downshift signal commands a lower automatically selectable gear, such as when shifting from 7th gear automatic to 6th gear automatic. Typically, the deviation W is set at approximately 200 RPM, although W may be set between approximately 50 RPM and 1000 RPM. If an engine RPM value of within the synchronous window W is not achieved within a synchronous RPM time T, then error recovery is performed as fully discussed hereinafter. Typically, T is set at approximately 300 milliseconds, although T values may range from between approximately 10 milliseconds to 1.5 seconds.

If an "in-gear" condition is detected, by techniques previously discussed with respect to MAT 52, within a predetermined engagement time E1, then gear engagement is confirmed (verified) and throttle control is returned to the operator. Although E1 is typically set at approximately 500 milliseconds, E1 times may be between approximately 10 milliseconds and 2.0 seconds. The engagement time period E1 typically begins when the processor provides the gear selection signal.

If an "in-gear" condition is not achieved within the engagement time E1, the engine RPM is altered for a second predetermined engagement time period E2. Specifically, the engine RPM is increased by the deviation R1, as shown in FIG. 7, if the ECM 20 has requested an upshift. If ECM 20 has requested a downshift, the engine RPM is decreased by the deviation R1 as shown in FIG. 8. Typically, R1 is set at 200 RPM and E2 is set at 64 milliseconds, although R1 values may be between approximately 50 RPM and 1000 RPM, and engagement times E2 may range from between approximately 5 milliseconds to 500 milliseconds. If an "in-gear" condition is achieved within the engagement time E2, then gear engagement is confirmed and throttle control is returned to the operator. The engagement time period E2 typically begins when the ECM 20 has governed the engine speed to the synchronous RPM value 312±R1.

If gear engagement is not confirmed within the engagement time E2, the engine RPM is altered for the duration of a third engagement time period E3. Specifically, if the ECM 20 has requested an upshift, the engine RPM is reduced by the deviation R2 below the synchronous RPM 312. If the ECM 20 has requested a downshift, the engine RPM is increased by the deviation R2 above the synchronous RPM 312 for the duration E3. Typically, R2 is set at 200 RPM and E3 is set at 16 milliseconds, although R2 values may be between approximately 50 RPM and 1000 RPM, and engagement time periods E3 may range from between approximately 5 milliseconds and 500 milliseconds. If an "in-gear" condition is achieved within the engagement time period E3, then gear engagement is confirmed and throttle control is returned to the operator. Typically, the engagement time period E3 begins coincident with the governing of the engine speed by the ECM 20 to the synchronous RPM value 312± the deviation R2.

Finally, if gear engagement is not confirmed within the engagement time period E3, the engine RPM is returned to within the window W of the synchronous RPM 312. If an "in-gear" condition is achieved within a fourth predetermined engagement time E4 after returning the engine RPM to the synchronous RPM level 312, then gear engagement is confirmed and throttle control is returned to the operator. Typically, the engagement time E4 is set at 500 milliseconds, although E4 times may range from between approximately 10 milliseconds and 1.5 seconds. Alternatively, the engagement time $E_R$ may be used in place of E4 as a measure of time delay in waiting for gear engagement. If, after the engine RPM is returned to within the window W of the synchronous RPM 312, an "in-gear" condition is achieved within the engagement time $E_R$ after the engagement time E1 has elapsed, (coinciding with the governing of the engine speed to the synchronous RPM 312± the deviation R1) then gear engagement is confirmed and throttle control is returned to the operator. Typically, the engagement time $E_R$ is set at approximately 500 milliseconds, although $E_R$ times may range from between 10 milliseconds to 2.0 seconds. In any event, if gear engagement cannot be confirmed within the engagement time E4 (or alternatively $E_R$), then error recovery is performed as fully discussed hereinafter which prevents the driver from having to manually attempt to engage the transmission after a failed automatic shift.

Figure 9:
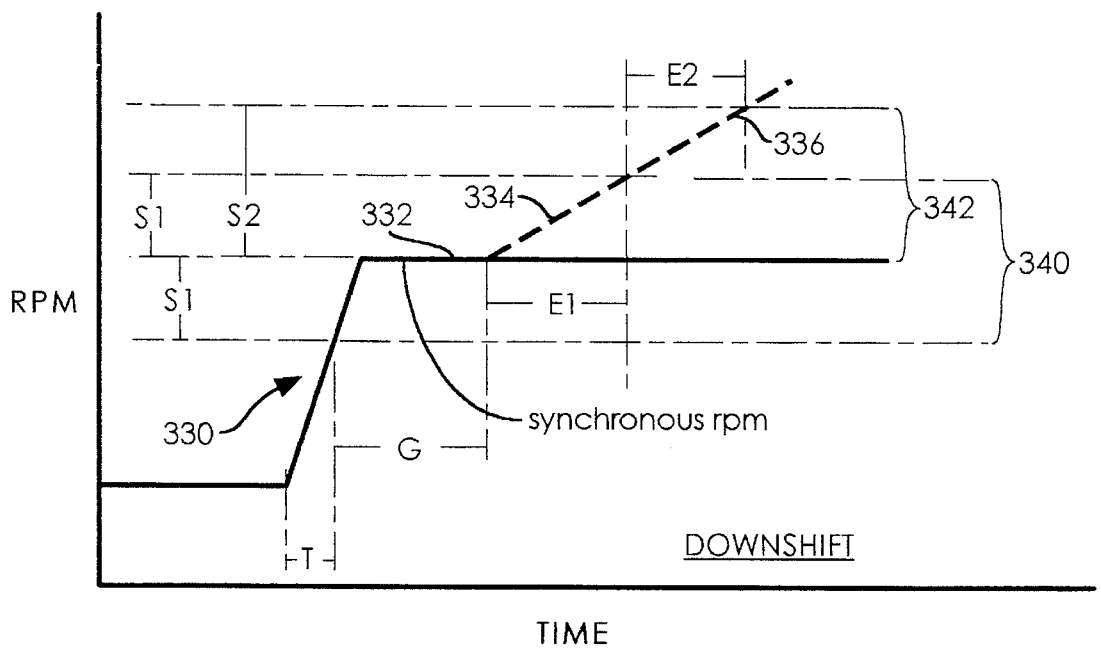
FIG. 9 is a graph of engine RPM versus time for a gear engagement process typically used during a downshift sequence in controlling the transmission embodiment of FIG. 3.
Figure 10:
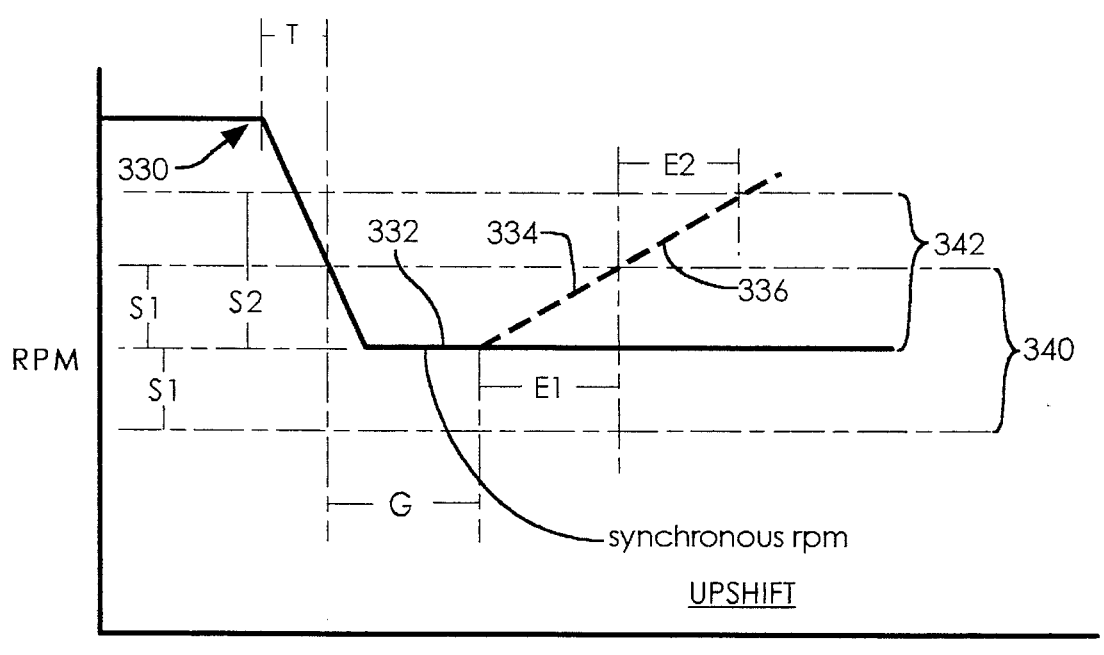
FIG. 10 is a graph of engine RPM versus time for a gear engagement process typically used during an upshift engagement process typically used during an upshift sequence in controlling the transmission embodiment of FIG. 3.

Referring now to FIGS. 9 and 10, a description of a process for confirming gear engagement in, for example, MAT 70, will now be provided. Curve 330 describes the engine RPM versus time during downshift (FIG. 9) and upshift (FIG. 10) operations. Once the cruise control or engine brake has been disabled by ECM 20, the presently engaged gear is disengaged pursuant to either an automatic upshift or automatic downshift command by ECM 20. When the ECM 20 detects gear disengagement, as previously discussed, the ECM 20 governs the engine speed to a calculated synchronous RPM represented by the RPM level 332 on RPM curve 330. If gear disengagement is not detected within a gear disengagement time D after commanding the transmission to engage a desired one of the automatically selectable gears, then the automatic shift process is aborted and error recovery is performed as fully discussed hereinafter. Typically, D is set at approximately 650 milliseconds, although D may range from between approximately 100 milliseconds to 2.0 seconds.

To achieve synchronous RPM 332, ECM 20 computes the fueling requirements to synchronize the engine speed, sensed at IN6, with the transmission tailshaft speed or drive shaft rotational speed, sensed at IN8, to allow engagement of the desired gear, and commands the fuel supply controller 26 to supply the fuel required to achieve synchronous RPM 332.

Once the engine RPM is within the synchronous RPM window 340 defined by the deviation S1 above and below the synchronous RPM 332, the ECM 20 commands the transmission to engage one of the automatically selectable gears as previously discussed. Thereafter, any engine RPM overshoot is allowed to settle for a period of time designated G, hereinafter referred to as the governor settling time, before gear engagement verification begins. Typically, G is set at approximately 330 milliseconds, although governor settling times may be between approximately 10 and 1,000 milliseconds. If an engine RPM value of within the synchronous window W is not achieved within a synchronous RPM time T, then error recovery is performed as fully discussed hereinafter. Typically, T is set at approximately 300 milliseconds, although T values may range from between approximately 10 milliseconds to 1.5 seconds.

At the end of the governor settling time G, the method of control of the engine changes from a governed engine speed to torque control and a percentage of engine torque is commanded by ECM 20. Typically engine torque is commanded at a 10 percent level as shown by engine RPM curve 334, although engine torque levels anywhere in the range of about 5% to about 100% of the torque output capability of the engine may be commanded. In any event, the ECM 20 commands the fuel supply controller 26 to supply the fuel required to achieve the desired engine torque.

If the engine RPM curve 330 stays within the synchronous RPM window 340 of ±S1 RPM for the duration of the engagement time E1 then gear engagement is confirmed and throttle control is returned to the driver. Typically, S1 is set at ±100 RPM and E1 is set at 380 milliseconds, although S1 may range from approximately ±50 RPM to ±1000 RPM, and E1 may range from approximately 10 to 1,000 milliseconds.

If the engine RPM curve 330 increases to a level greater than the upper limit S1 of the synchronous RPM window 340 during the time E1, then a new synchronous RPM window 342, defined by S2 as an upper limit and the synchronous RPM 332 as a lower limit, is established as shown in FIGS. 7 and 8. The percentage of torque commanded to the engine may be altered when synchronous RPM window 340 is increased to synchronous RPM window 342. However, the torque level may also remain a constant percentage as shown by engine RPM curve 336 in FIGS. 9 and 10. Although S2 may be set anywhere in the range 50–1000 RPM, it is typically set at approximately 200 RPM. Gear engagement is confirmed, and throttle control returned to the driver, if the engine RPM 330 remains within the new synchronous RPM window 342 for the engagement time E2. If, however, the engine RPM 330 increases to a level greater than the upper limit S2 of the synchronous RPM window 342 during the time E2, gear engagement will not be confirmed and error recovery is performed by ECM 20 as will be more fully discussed hereinafter. The engagement time E2 is typically 500 milliseconds, although E2 may be set anywhere within the range of between approximately 10 to 1,000 milliseconds.

Alternatively, it is possible to reverse the torque in the transmission or drivetrain by changing the torque level 336 commanded during the time E2 to a negative torque value. Such a technique is fully described in a copending application assigned to the assignee of the present invention, and will not be discussed further.

Once gear engagement is confirmed, and throttle control is returned to the driver, cruise control or engine braking is enabled. These functions are disabled during the gear engagement confirmation process to prevent the engine from rapidly accelerating or decelerating if no gear engagement is confirmed. Normally, driveline surge will be small enough to allow the engine RPM to stay within the first synchronous RPM window 340 so that confirmation will occur within the engagement time E1. On the few shifts that do have excessive driveline surge, gear engagement can still normally be confirmed within the engagement time E2. If gear engagement cannot be confirmed within the engagement time E2, then error recovery is performed as fully discussed hereinafter.

ERROR RECOVERY

Referring to the automatic gear shift processes of FIGS. 7–8 and 9–10, gear engagement may not be achieved in an auto-shift sequence in at least three specific instances as previously discussed. First, the automatic shift process may be aborted if gear disengagement (neutral) is not detected within a gear disengagement time D after commanding the transmission to a desired one of the automatically selectable gears. Second, synchronous engine RPM may not be achieved within a synchronous RPM time T. Finally, gear engagement may not occur within the allotted times shown and described. With respect to the gear engagement process shown in FIGS. 7–8, gear engagement will fail if engagement is not confirmed within the time $E_R$. With respect to the gear engagement process shown in FIGS. 9–10, gear engagement will fail if engagement is not confirmed within the time E2. If the automatic gear shift process fails, or is aborted, for any of these reasons, the ECM 20 determines, in accordance with the present invention, the safest and/or most likely to engage transmission gear to command so that the driver does not have to manually attempt to engage the transmission after the failed/aborted automatic shift attempt.

If the transmission fails to disengage during an auto-shift attempt because the transmission disengagement time D has elapsed, after commanding a desired one of the automatically selectable transmission gears, then the ECM 20 commands the gear that was engaged prior to the auto-shift attempt, and then returns throttle control to the driver. Thus, in the case of MAT 52, if a downshift from 7th to 6th gear was commanded, for example, then ECM 20 will command 7th gear if D elapses prior to detecting transmission disengagement in the auto-shift sequence. In the case of MAT 70, if an upshift to high split was commanded, for example, then ECM 20 will command low split if D elapses prior to detecting transmission disengagement in the auto-shift sequence.

If gear engagement fails during an automatic downshift attempt, either due to failure to reach synchronous RPM within the time T or failure to confirm engagement within the allotted times ($E_R$ for MAT 52, or E2 for MAT 70), the ECM 20 commands the transmission to the highest of the automatically selectable gears, and then returns throttle control to the driver. Thus, in the case of MAT 52, for example, ECM 20 will command 7th gear, and in the case of MAT 70, for example, ECM 20 will command high split. In either case, however, the cruise control and engine brake functions will be disabled until gear engagement is confirmed as previously discussed.

If gear engagement fails during an automatic upshift attempt, either due to failure to reach synchronous RPM within the time T or failure to confirm engagement within the allotted times ($E_R$ for MAT 52, or E2 for MAT 70), and the tailshaft speed, converted to RPM, is greater than a predetermined engine RPM value $R_T$, then ECM 20 commands the highest of the automatically selectable gears and returns throttle control to the driver. Thus, in the case of MAT 52, for example, ECM 20 will command 7th gear, and in the case of MAT 70, for example, ECM 20 will command high split. If, however, the tailshaft speed is less than or equal to $R_T$, then ECM 20 will execute an auto-downshift sequence to the next lower gear and return throttle control to the driver. Thus, in the case of MAT 52, for example, ECM 20 will autoshift to 6th gear, and in the case of MAT 70, for example, ECM 20 will autoshift to low split. In either case, $R_T$ is typically set at a predetermined ratio of the rated engine speed to lowest autoshift gear ratio such as between the range of 1390 RPM and 1850 RPM, although the present invention contemplates $R_T$ values of between approximately 1100 RPM and 2500 RPM.

If the tailshaft speed, converted to RPM, is less than or equal to $R_T$, an automatic downshift sequence is performed, as previously explained with reference to FIGS. 7–10, wherein the synchronous RPM is determined to be the tailshaft speed at the start of the auto-shift sequence multiplied by a gear ratio value GR, wherein GR corresponds to the highest auto-shift gear ratio. Typically, GR is between 1.0 and 1.3, although this ratio is set by the transmission and may therefore take on any value. The remaining downshift sequence, and gear confirmation process, is carried out as previously discussed. If the automatic downshift attempt fails, either due to failure to reach synchronous RPM within the time T or failure to confirm engagement within the allotted times ($E_R$ for MAT 52 or E2 for MAT 70), the ECM 20 commands the transmission to the highest of the automatically selectable gears, and then returns throttle control to the driver. Thus, in the case of MAT 52, for example, ECM 20 will command 7th gear, and in the case of MAT 70, for example, ECM 20 will command high split. In either case, however, the cruise control and engine brake functions will be disabled, until gear engagement is confirmed as previously discussed.

Table 1, shown below, summarizes the actions taken for failed auto-shift attempts.

TABLE 1

| ATTEMPT | FAILURE | ACTION TAKEN MAT 52 | ACTION TAKEN MAT 70 |
| --- | --- | --- | --- |
| Downshift | Failed to reach neutral (disengage within D). | Command 7th gear and return throttle control to driver. | Command high split and return throttle control to driver. |
| Upshift | Failed to reach neutral (disengage within D). | Command 6th gear and return throttle control to driver. | Command low split and return throttle control to driver. |
| Downshift | Failed to reach synchronous speed within T. | Command 7th gear and return throttle control to driver. | Command high split and return throttle control to driver. |
| Upshift | Failed to reach synchronous speed within T. | If tailshaft RPM > $R_T$, then command 7th gear and return throttle control to driver. Otherwise, autoshift to 6th gear and return throttle control to driver. | If tailshaft RPM > $R_T$, then command high split and return throttle control to driver. Otherwise, autoshift to low low split and return throttle control to driver |
| Downshift | Failed to engage desired gear within allotted gear engagement time. | Command 7th gear and return throttle control to driver. | Command high split and return throttle control to driver. |
| Upshift | Failed to engage desired gear within allotted gear engagement time. | If tailshaft RPM > $R_T$, then command 7th gear and return throttle control to driver. Otherwise, autoshift to 6th gear and return throttle control to driver. | If tailshaft RPM > $R_T$, then command high split and return throttle control to driver. Otherwise, autoshift to low split and return throttle control to driver |
| Downshift after failed upshift | Failed to reach synchronous speed within T, or failed to confirm gear engagement. | Command 7th gear and return throttle control to driver. | Command high split and return throttle control to driver |

Figure 11A:
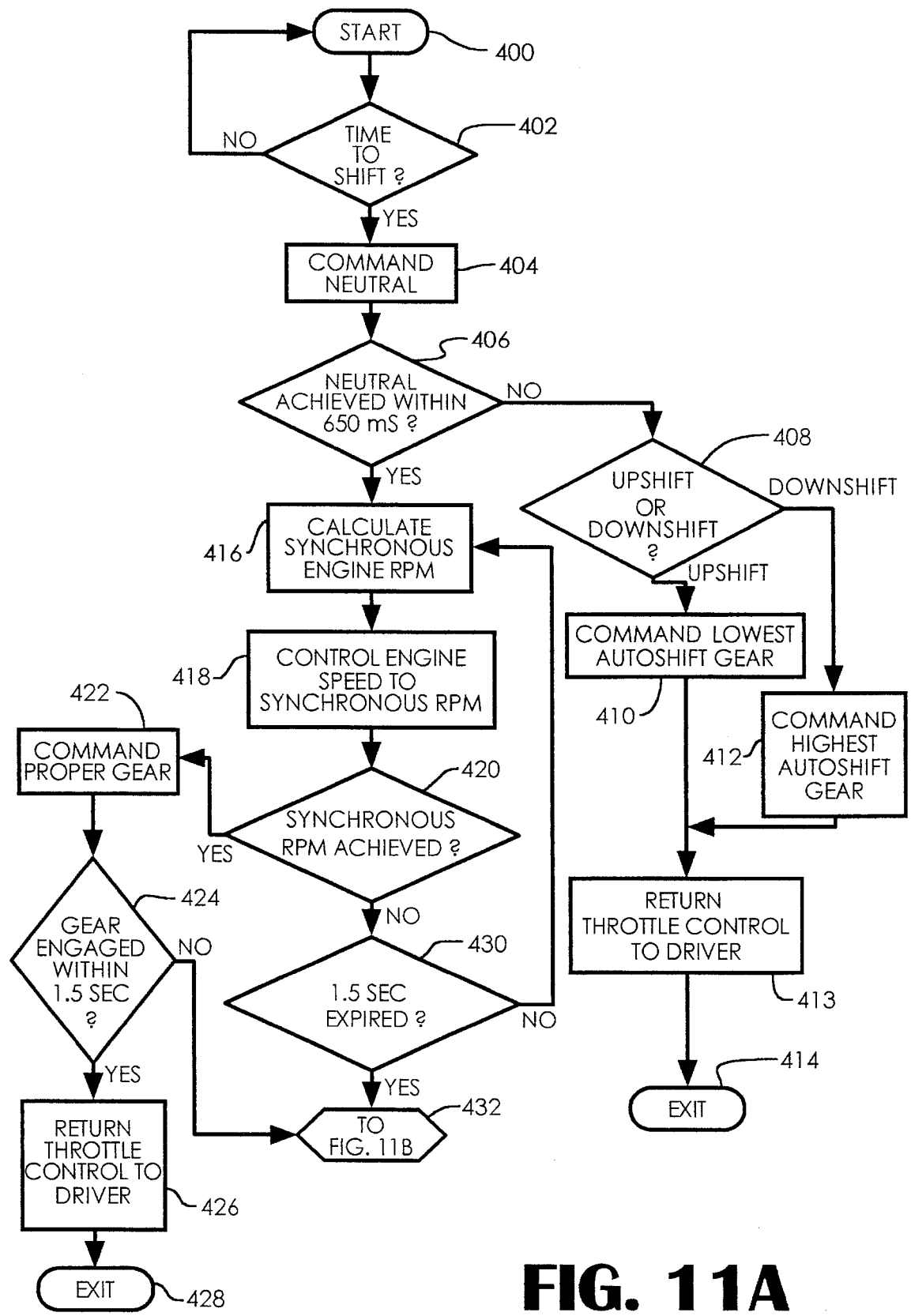
FIGS. 11A and 11B describe a flowchart of an algorithm for performing error recovery after an aborted automatic shift attempt, in accordance with the present invention, by commanding a predetermined transmission gear.
Figure 11B:
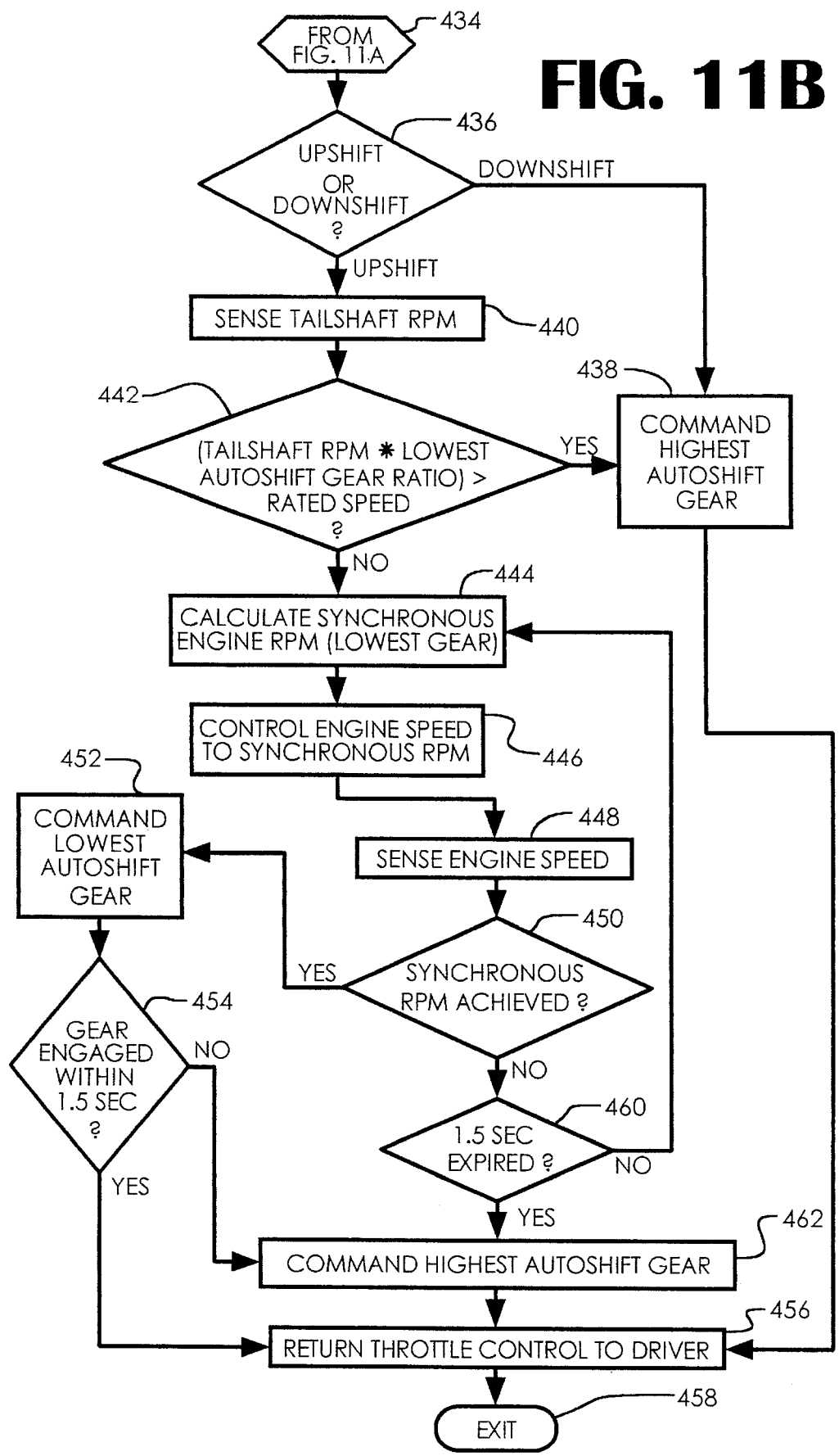

Referring now to FIGS. 11A and 11B, a flowchart for a preferred algorithm for performing error recovery after a failed/aborted automatic shift attempt, in accordance with the present invention, is shown. The flowchart of FIGS. 11A and 11B implements concepts described herein via ECM 20 and all numerical values described in relation to this flowchart represent typical values and other values are contemplated by this invention as elsewhere noted. The algorithm begins at step 400 and at step 402, ECM 20 determines whether an automatic shift is desired. If not, the algorithm loops back to the start 400 until an automatic shift sequence is to be carried out. If an automatic shift is determined to be carried out at step 402, ECM 20 commands the transmission to neutral (commands disengagement of the engine from the transmission) at step 404. At step 406, the ECM 20 determines whether disengagement of the transmission from the engine occurred within 650 milliseconds. If not, ECM 20 determines, at step 408, whether an automatic upshift or an automatic downshift was requested at step 402. If, at step 408, ECM 20 determines that an upshift was requested at step 402, ECM 20 commands the lowest of the automatically selectable gears at step 410. With MAT 52, this step corresponds to commanding 6th gear while low split is commanded with respect to MAT 70. If ECM determines, at step 408, that an automatic upshift was requested at step 402, ECM 20 commands the highest of the automatically selectable gears at step 412. With MAT 52, this step corresponds to commanding 7th gear while high split is commanded with respect to MAT 70. After commanding the appropriate gear at either of steps 410 or 412, throttle control is returned to the driver at step 413 and ECM 20 exits the algorithm at step 414.

If neutral was achieved within 650 milliseconds at step 406, a synchronous engine RPM value is calculated at step 416. Thereafter, ECM 20 controls the engine speed, at step 418, to the synchronous RPM value calculated at step 416. At step 420, ECM 20 determines whether the synchronous RPM calculated at step 416 has been achieved. If not, the algorithm continues at step 430 to determine whether 1.5 seconds has expired since attempting to control the engine speed to the synchronous RPM value. If 1.5 seconds has not expired at step 430, the algorithm loops back to step 416 to recalculate a synchronous RPM value. In a preferred embodiment, a synchronous RPM value is recalculated at least every 16 milliseconds.

If the synchronous RPM value has been achieved at step 420, ECM 20 commands the desired gear at step 422, and determines at step 424 whether the desired gear was engaged within 1.5 seconds. If, at step 424, the desired gear was engaged within 1.5 seconds, throttle control is returned to the driver at step 426 and ECM 20 thereafter exits the algorithm at step 428. If, however, the desired gear was not engaged within 1.5 seconds at step 424, or if the synchronous RPM value of step 416 was not achieved within 1.5 seconds at step 430, then the algorithm continues to FIG. 11B at 432.

Referring now to FIG. 11B, the algorithm of FIG. 11A continues at 434, and at step 436, ECM 20 determines whether an automatic upshift or an automatic downshift was requested at step 402. If an automatic downshift was requested, ECM 20 commands the highest of the automatically selectable gears at step 438, and thereafter returns throttle control to the driver. If, at step 436, ECM 20 determines that an automatic upshift was requested, the tailshaft RPM is sensed at step 440. As previously discussed, step 440 entails sensing tailshaft speed and converting this speed to RPM. If, at step 442, the sensed tailshaft RPM value multiplied by the lowest automatically selectable gear ratio is greater than a predetermined rated engine speed, then ECM 20 commands the highest of the automatically selectable gears at step 438. Typically, the lowest of the automatically selectable gear ratios, established by the transmission, is between 1.0 and 1.33, and the predetermined rated engine speed is approximately 1850 RPM. As indicated previously, however, other gear ratio and rated engine speed values are contemplated by the present invention.

If, at step 442, the product of the tailshaft RPM value and the lowest automatically selectable gear ratio is less than or equal to the predetermined rated engine speed, a synchronous engine RPM value, corresponding to the synchronous RPM value for the lowest of the automatically selectable gears, is calculated at step 444. If, at step 436, a downshift was requested, or the product of the tailshaft RPM value and the lowest of the automatically selectable gears is greater than the rated engine speed at step 442, ECM 20 commands the highest of the automatically selectable gears at step 438. Program execution continues thereafter at step 456.

From step 444, program execution continues at step 446 where the engine speed is controlled to the synchronous engine RPM value calculated at step 444, and the engine speed is thereafter sensed at step 448. The algorithm continues from step 448 at step 450 where ECM 20 determines whether the engine speed, sensed at step 448 is approximately the synchronous engine speed calculated at step 444. If not, ECM 20 determines whether 1.5 seconds has expired since attempting to control the engine speed to the synchronous engine speed calculated at step 444. If 1.5 seconds has not expired, the algorithm loops back to step 444 to calculate a new synchronous engine RPM value. As with steps 416-430, a new synchronous engine RPM value is calculated at least every 16 milliseconds.

If, at step 450, ECM 20 determines that the engine has achieved the synchronous RPM value, then ECM 20 commands the lowest of the automatically selectable gears at step 452. At step 454, ECM 20 determines whether gear engagement has been achieved within 1.5 seconds of commanding a gear at step 452. If gear engagement has been achieved, throttle control is returned to the driver at step 456. If, at step 454, gear engagement has not been achieved within 1.5 seconds at step 454, or if synchronous engine RPM has not been achieved within 1.5 seconds at step 460, ECM 20 commands the highest of the automatically selectable gears at step 462 and thereafter returns throttle control to the driver at step 456. After ECM 20 executes step 456, ECM 20 exits the algorithm at step 458.

Another event that may cause an automatic shift operation to fail, or be aborted, is the depression of the clutch pedal during an auto-shift between the automatically selectable transmission gears. If, for example, the clutch switch SW4 indicates that the clutch pedal 36 (FIG. 1) has been depressed during an auto-shift operation of MAT 70, the current automatically selectable gear is held by ECM 20 and throttle control is returned to the driver. If the clutch switch SW4 indicates that the clutch pedal 36 has been depressed during an auto-shift operation of MAT 52, the action taken by ECM 20 depends on the status of the top gear indicator switch SW6, the gear commanded when the clutch depression was detected and the vehicle speed, as will be more fully described below.

If an auto-shift sequence has started in the operation of MAT 52, and the ECM 20 detects, via switch SW4, that the clutch pedal has been depressed while the top gear indicator switch SW6 is indicating top gear and neutral has not been commanded (one of the top gears is commanded), then, as with MAT 70, the current automatically selectable gear is held by ECM 20 and throttle control is returned to the driver. If, on the other hand, the same conditions apply except that neutral was commanded when the clutch pedal was detected as being depressed, then 7th gear is commanded and throttle control is returned to the driver as previously discussed.

If an auto-shift has started, the clutch switch SW4 indicates that the clutch pedal 36 has been depressed, the top gear indicator switch SW6 is not indicating top gear and neutral was commanded when the clutch pedal 36 was detected as being depressed, then the vehicle speed is sensed and tested against a predetermined vehicle speed VS. If the sensed vehicle speed is less than or equal to VS, then the auto-shift is aborted and throttle control is returned to the driver. If, on the other hand, the sensed vehicle speed is greater than VS, then ECM 20 commands 7th gear and thereafter returns throttle control to the driver. In a preferred embodiment, VS is set at 37 mph, although the present invention contemplates VS values of between approximately 25 mph and 100 mph.

If an auto-shift has started, the clutch switch SW4 indicates that the clutch pedal 36 has been depressed, the top gear indicator switch SW6 is not indicating top gear and either 6th or 7th gear was commanded when the clutch pedal 36 was detected as being depressed, then the vehicle speed is again sensed and tested against the predetermined vehicle speed VS. If the sensed vehicle speed is less than or equal to VS, then ECM 20 commands neutral and returns throttle control to the driver. If, on the other hand, the sensed vehicle speed is greater than VS, then ECM 20 holds the current automatically selectable gear and throttle control is returned to the driver. Table 2 summarizes the actions taken if the clutch switch SW4 indicates that the clutch pedal 36 has been depressed during an auto-shift.

TABLE 2

| TGI WHEN CLUTCH DEPRESSED | GEAR COMMANDED WHEN CLUTCH DEPRESSED | VEHICLE SPEED LESS THAN OR EQUAL TO VS | ACTION TAKEN (MAT 52) |
| --- | --- | --- | --- |
| YES | 6th or 7th | Don't Care | Hold current gear and return throttle control to driver. |
| YES | NEUTRAL | Don't Care | Command 7th gear and return throttle control to driver. |
| NO | NEUTRAL | YES | Return throttle control to driver. |
| NO | NEUTRAL | NO | Command 7th gear and return throttle control to driver. |
| NO | 6th or 7th | YES | Command neutral and return throttle control to driver. |
| NO | 6th or 7th | NO | Hold current gear and return throttle control to driver. |

Figure 12:
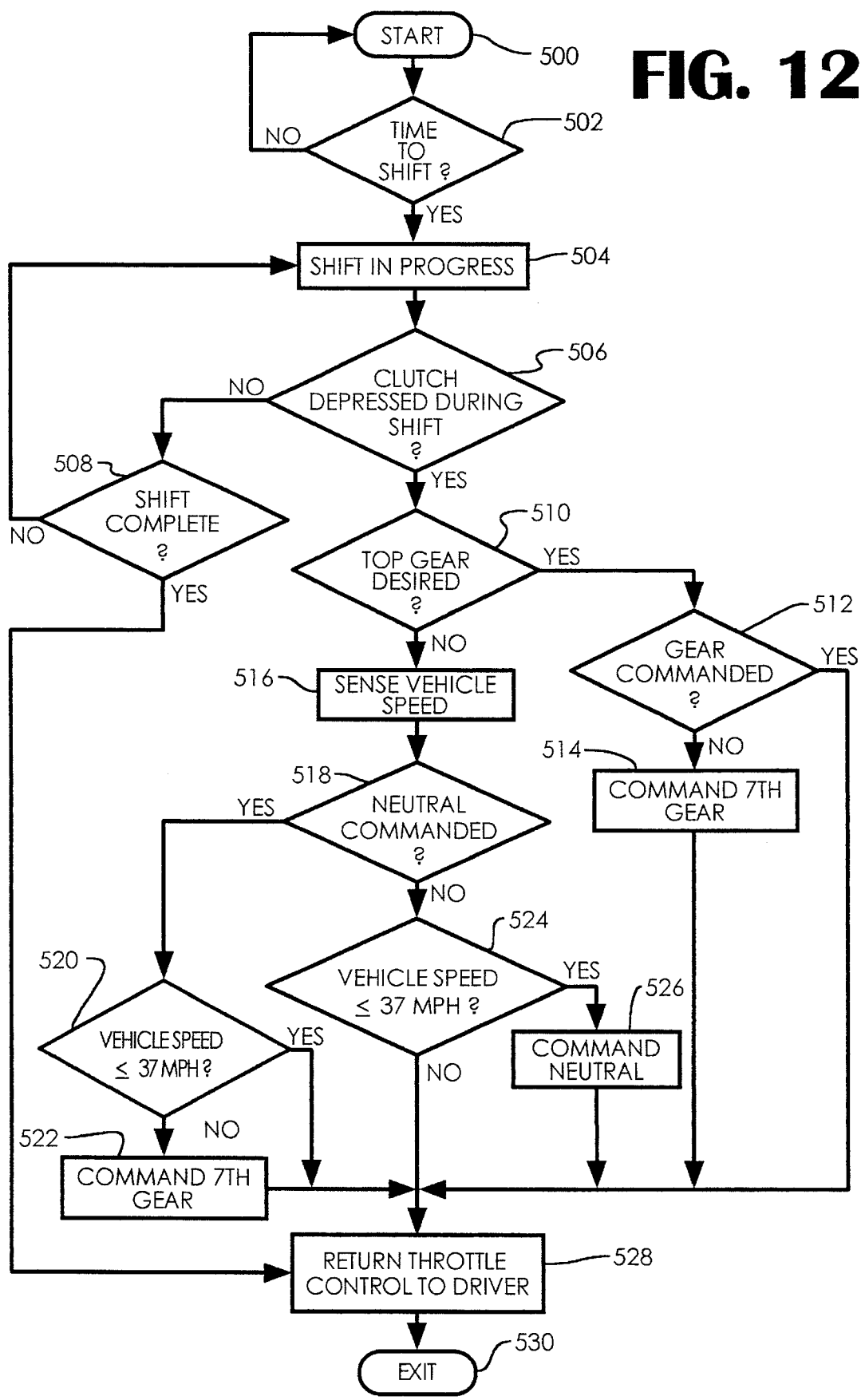
FIG. 12 describes a flowchart of an algorithm for commanding a transmission gear if the clutch is depressed during an auto-shift sequence in a manual/automatic transmission, in accordance with the present invention.

Referring now to FIG. 12, a flowchart for a preferred algorithm for performing error recovery after detection of a clutch depression during an auto-shift attempt, in accordance with the present invention, is shown. The algorithm of FIG. 12 is executed by ECM 20 to control a manual/automatic transmission having a top gear indicator feature, such as MAT 52, and begins at step 500. At step 502, ECM 20 determines whether an automatic shift is desired. If not, the algorithm loops back to the start 500 until an automatic shift sequence is to be carried out. If an automatic shift is determined to be carried out at step 502, ECM 20 begins, at step 504, the automatic shift process. At step 506, ECM 20 tests the clutch switch SW4 to determine whether the clutch pedal 36 has been depressed during the present automatic shift sequence. If ECM 20 determines, at step 506, that the clutch pedal 36 has not been depressed during the present automatic shift process, the algorithm continues at step 508 where ECM determines whether the current automatic shift process is complete. If so, throttle control is returned to the driver at step 528. If the present shift process is not complete at step 508, the algorithm loops back to step 504 to continuously monitor the status of the clutch switch SW4 during the automatic shift attempt.

If ECM 20 determines that the clutch pedal 36 has been depressed during the automatic shift attempt at step 506, the algorithm continues at step 510 where ECM 20 tests the status of the top gear indicator switch SW6 to determine whether the top gear of MAT 52 is desired. If top gear is indicated at step 510, ECM 20 determines whether the automatic shift request of step 502 commanded one of the automatically selectable gears at step 512. If so, throttle control is returned to the driver at step 528. If the automatic shift request of step 502 did not request one of the automatically selectable gears at step 512, the algorithm advances to step 514 where ECM 20 commands 7th gear before returning throttle control to the driver at step 528.

If switch SW6 does not indicate top gear at step 510, vehicle speed is sensed at step 516 and ECM determines, at step 518, whether the shift request sensed at step 502 was a command for neutral. If, at step 518, ECM 20 determines that the shift request detected at step 502 was a command for neutral, the vehicle speed sensed at step 516 is compared to a value of 37 mph at step 520. If the vehicle speed is less than or equal to 37 mph at step 520, throttle control is returned to the driver at step 528. If the vehicle speed is greater than 37 mph at step 520, ECM 20 commands 7th gear at step 522 and thereafter returns throttle control to the driver at step 528.

If, at step 518, a request for one of the automatically selectable gears was detected at step 502, the vehicle speed sensed at step 516 is again compared to the value of 37 mph at step 524. If the vehicle speed is greater than 37 mph at step 524, throttle control is returned to the driver at step 528. If the vehicle speed is less than or equal to 37 mph at step 524, ECM 20 commands neutral at step 526 and then advances to step 528 to return throttle control to the driver. The algorithm proceeds from step 528 to step 530 where the ECM 20 exits the algorithm.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for commanding a transmission gear after an aborted automatic shift attempt in a vehicle having an engine with a throttle capable of being enabled for operator control and of being inhibited from operator control, and a manual/automatic transmission having a plurality of manual and automatically selectable gears, wherein the aborted automatic shift attempt includes inhibiting throttle control by the operator, disengaging the transmission from the engine, controlling the engine speed to a synchronous RPM value at which an ensuing automatic shift should take place, and commanding one of the plurality of automatically selectable gears, the method comprising the steps of:

(1) performing steps (2)–(4) if the shift was aborted because the transmission did not disengage from the engine within a first predetermined time period;

(2) commanding the lowest of the automatically selectable gears if the aborted automatic shift attempt was an upshift;

(3) commanding the highest of the automatically selectable gears if the aborted automatic shift attempt was a downshift; and (4) enabling throttle control by the operator.

2. The method of claim 1 wherein the determination of whether the transmission has disengaged from the engine includes the steps of:

(a) sensing engine speed;

(b) sensing vehicle speed; and (c) detecting disengagement if said engine speed is outside a predetermined disengagement RPM range.

3. The method of claim 2 wherein said predetermined disengagement RPM range is defined as the synchronous RPM value plus deltal RPM and the synchronous RPM value minus deltal RPM.

4. The method of claim 3 wherein said deltal RPM is within the range of approximately 5 RPM to 500 RPM.

5. The method of claim 1 wherein the transmission further includes a neutral transmission position indicator and the determination of whether the transmission has disengaged from the engine includes the steps of:

(a) monitoring the status of the neutral transmission position indicator; and (b) detecting disengagement if said neutral transmission position indicator indicates that the transmission has achieved a neutral operational state.

6. The method of claim 1 wherein said first predetermined time period is within the range of 100 milliseconds to 2.0 seconds.

7. A method for commanding a transmission gear after an aborted automatic shift attempt in a vehicle having an engine with a throttle capable of being enabled for operator control and of being inhibited from operator control, and a manual/automatic transmission including a plurality of manual and automatically selectable gears, wherein the aborted automatic shift attempt includes inhibiting throttle control by the operator, disengaging the transmission from the engine, controlling the engine speed to a first synchronous RPM value at which an ensuing automatic shift should take place, and commanding one of the plurality of automatically selectable gears, the method comprising the steps of:

(1) performing steps (2)–(10) if the shift was aborted because the engine speed did not achieve the first synchronous RPM value within a first predetermined time period;

(2) performing steps (9)–(10) if the aborted automatic shift attempt was a downshift;

(3) sensing vehicle speed;

(4) performing steps (9)–(10) if the product of the vehicle speed and a gear ration of the lowest of the automatically selectable gears is greater than a predetermined speed;

(5) calculating a second synchronous RPM value corresponding to an engine speed at which an automatic shift to the lowest of the automatically selectable gears should take place;

(6) fueling the engine to achieve an engine speed within a predetermined RPM range of said second synchronous RPM value;

(7) sensing engine speed;

(8) performing steps (9)–(10) if said engine speed is not within said predetermined RPM range of said second synchronous RPM value within a second predetermined time period;

(9) commanding the highest of the automatically selectable transmission gears; and

(10) enabling throttle control by the driver.

8. The method of claim 7 further including the following steps if the condition of step (1) is met:

(11) performing steps (12)–(13) if said engine speed is within said predetermined RPM range of said second synchronous RPM value within said second predetermined time period;

(12) commanding the lowest of the automatically selectable transmission gears; and

(13) enabling throttle control by the operator.

9. The method of claim 8 further including the following steps if the condition of step (1) is met:

(14) performing steps (15)–(16) if engagement of the lowest of the automatically selectable transmission gears is not achieved within a third predetermined time period;

(15) commanding the highest of the automatically selectable transmission gears; and

(16) enabling throttle control by the operator.

10. The method of claim 7 wherein the determination of whether the engine speed has achieved the first synchronous RPM value includes the steps of:

(a) detecting tailshaft speed;

(b) calculating the synchronous RPM value corresponding to an engine speed which is synchronized with the vehicle speed to thereby permit the ensuing automatic gear shift to take place;

(c) detecting engine speed;

(d) varying fuel delivery rates to the engine; and (e) determining that the engine speed has achieved the first synchronous RPM value if the engine speed is within said predetermined RPM range of the first synchronous RPM value.

11. The method of claim 10 wherein said predetermined RPM range is defined as the synchronous RPM value plus delta2 RPM and the synchronous RPM value minus delta2 RPM.

12. The method of claim 11 wherein said delta2 RPM is within the range of approximately 50 RPM to 1000 RPM.

13. The method of claim 9 wherein said first, second and third predetermined time periods are within the range of 10 milliseconds to 2.0 seconds.

14. The method of claim 7 wherein step (4) further includes sensing tailshaft speed and engine speed; and wherein said gear ration of the lowest of the automatically selectable gears is defined as the engine RPM value for one revolution of the lowest of the automatically selectable gears divided by the tailshaft RPM value calculated over a predetermined number of teeth of the lowest of the automatically selectable gears.

15. A control device for use with a motor vehicle having an engine with a throttle capable of operator control and of being inhibited from operator control, and a manual/automatic transmission including a gear selection input and further having a manual gear selection mode of operation and an automatic gear shift mode of operation including a plurality of automatically selectable gears, said device comprising:

means for detecting gear disengagement when the engine is disengaged from the transmission; and processor means for controlling the automatic shift mode of operation, said processor means commencing the automatic shift mode of operation by inhibiting the throttle from operator control and commanding disengagement of the engine from the transmission, said processor means responding to the means for detecting gear disengagement by aborting the automatic shift attempt if said means for detecting gear disengagement fails to detect gear disengagement within a first predetermined time period after commanding gear disengagement, said processor means thereafter commanding the highest of the automatically selectable transmission gears if the automatic shift attempt was a downshift attempt, said processor means otherwise commanding the lowest of the automatically selectable transmission gears, and said processor means thereafter returning throttle control to the operator.

16. A control device for use with a motor vehicle having an engine with a throttle capable of operator control and of being inhibited from operator control, and a manual/automatic transmission including a gear selection input and further having a manual gear selection mode of operation and an automatic gear shift mode of operation and including a plurality of automatically selectable gears, said device comprising:

means for detecting gear disengagement when the engine is disengaged from the transmission and providing a gear disengagement signal corresponding thereto;

means for sensing engine speed and providing an engine speed signal corresponding thereto; and processor means for controlling the automatic shift mode of operation, said processor means having a first input for receiving said gear disengagement signal and a second input for receiving said engine speed signal, said processor means commencing the automatic shift mode of operation by inhibiting the throttle from operator control and commanding disengagement of the engine from the transmission, said processor means responding to said gear disengagement signal to govern the engine speed to a first predetermined RPM level after gear disengagement is detected said processor means responding to said engine speed signal to abort the automatic shift attempt if said means for sensing engine speed fails to detect an engine speed within a predetermined range of said first predetermined RPM level within a first predetermined time period after governing the engine speed, said processor means thereafter commanding the highest of the automatically selectable transmission gears and enabling throttle control by the operator if the automatic shift attempt was a downshift attempt.

17. The control device of claim 16 further including:

means for sensing vehicle speed and producing a vehicle speed signal corresponding thereto; and said processor means includes a third input for receiving said vehicle speed signal, wherein said processor means receives said vehicle speed signal and commands the highest of the automatically selectable transmission gears and enables throttle control by the operator if the product of the vehicle speed and a ratio of the lowest of the automatically selectable transmission gears exceeds a predetermined speed level, and the automatic shift attempt was an upshift attempt.

18. The control device of claim 17 further including:

means for detecting gear engagement when the engine is engaged to the transmission and providing a gear engagement signal corresponding thereto; and said processor means includes a fourth input for receiving said gear engagement signal, wherein said processor means governs the engine speed to a second predetermined RPM level if the product of the vehicle speed and said ratio of the lowest of the automatically selectable transmission gears is less than a predetermined speed, and the automatic shift attempt was an upshift attempt, and further wherein said processor means thereafter responds to said engine speed signal to command the lowest of the automatically selectable transmission gears and enable throttle control by the operator if the engine speed is within a said predetermined range of said first predetermined RPM level within said first predetermined time period after governing the engine speed, and said processor means responds to said engine speed signal and said gear engagement signal to command the highest of the automatically selectable transmission gears and enable throttle control by the operator if one of the engine speed is not within a said predetermined range of said first predetermined RPM level within said first predetermined time period after governing the engine speed, and the means for detecting gear engagement fails to detect engagement of the engine to said lowest of the automatically selectable transmission gears within a third predetermined time period after commanding said lowest automatic gear.

19. A control device for use with a motor vehicle having an engine with a throttle capable of operator control and of being inhibited from operator control, and a manual/automatic transmission including a gear selection input and further having a manual gear selection mode of operation and an automatic gear shift mode of operation and including a plurality of automatically selectable gears, said device comprising:

means for detecting gear disengagement when the engine is disengaged from the transmission and providing a gear disengagement signal corresponding thereto;

means for detecting gear engagement when the engine is engaged to the transmission and providing a gear engagement signal corresponding thereto;

means for sensing engine speed and providing an engine speed signal corresponding thereto; and processor means for controlling the automatic shift mode of operation, said processor means having a first input for receiving said gear disengagement signal, a second input for receiving said gear engagement signal and a third input for receiving said engine speed signal, said processor means commencing the automatic shift mode of operation by inhibiting the throttle from operator control and commanding disengagement of the engine from the transmission, said processor means responding to said gear disengagement signal to govern the engine speed to a first predetermined RPM level after gear disengagement is detected, said processor means responding to said engine speed signal to command an appropriate one of the plurality of automatically selectable transmission gears when said engine speed signal is within a first RPM range of said first predetermined RPM level, said processor means responding to said gear engagement signal to abort the automatic shift attempt if said means for detecting gear engagement fails to detect gear engagement of the engine to said appropriate one of the plurality of automatically selectable transmission gears within a first predetermined time period after commanding said appropriate gear, said processor means thereafter commanding the highest of the automatically selectable transmission gears and enabling throttle control by the operator if the automatic shift attempt was a downshift attempt.

20. The control device of claim 19 further including:

means for sensing vehicle speed and producing a vehicle speed signal corresponding thereto; and said processor means includes a fourth input for receiving said vehicle speed signal, wherein said processor means receives said vehicle speed signal and commands the highest of the automatically selectable transmission gears if the product of the vehicle speed and a ratio of the lowest of the automatically selectable transmission gears exceeds a predetermined speed, and the automatic shift attempt was an upshift attempt, and further wherein said processor means governs the engine speed to a second predetermined RPM level if the product of the vehicle speed and said ratio of the lowest of the automatically selectable transmission gears is less than a predetermined speed, and the automatic shift attempt was an upshift attempt, said processor means thereafter responds to said engine speed signal to command the lowest of the automatically selectable transmission gears and enable throttle control by the operator if the engine speed is within a said predetermined range of said first predetermined RPM level within said first predetermined time period after governing the engine speed, and said processor means responds to said engine speed signal and said gear engagement signal to command the highest of the automatically selectable transmission gears and enable throttle control by the operator if one of the engine speed is not within a said predetermined range of said first predetermined RPM level within said first predetermined time period after governing the engine speed, and the means for detecting gear engagement fails to detect engagement of the engine to said lowest of the automatically selectable transmission gears within a third predetermined time period after commanding said lowest automatic gear.

* * * * *